(12) United States Patent
Aisenbrey

(10) Patent No.: US 7,268,562 B2
(45) Date of Patent: Sep. 11, 2007

(54) LOW COST DETECTIBLE PIPE AND ELECTRIC FENCING MANUFACTURED FROM CONDUCTIVE LOADED RESIN-BASED MATERIALS

(75) Inventor: Thomas Aisenbrey, Littleton, CO (US)

(73) Assignee: Integral Technologies, Inc., Bellingham, WA (US)

( * ) Notice: Subject to any disclaimer, the term of this patent is extended or adjusted under 35 U.S.C. 154(b) by 0 days.

(21) Appl. No.: 11/286,227

(22) Filed: Nov. 23, 2005

(65) Prior Publication Data

US 2006/0091887 A1 May 4, 2006

Related U.S. Application Data

(63) Continuation-in-part of application No. 10/877,092, filed on Jun. 25, 2004, which is a continuation of application No. 10/309,429, filed on Dec. 4, 2002, now Pat. No. 6,870,516, which is a continuation-in-part of application No. 10/075,778, filed on Feb. 14, 2002, now Pat. No. 6,741,221.

(60) Provisional application No. 60/638,082, filed on Dec. 21, 2004, provisional application No. 60/630,587, filed on Nov. 24, 2004, provisional application No. 60/317,808, filed on Sep. 7, 2001, provisional application No. 60/269,414, filed on Feb. 16, 2001, provisional application No. 60/268,822, filed on Feb. 15, 2001.

(51) Int. Cl.
*G01R 31/02* (2006.01)
*H01B 5/00* (2006.01)
*F16L 9/14* (2006.01)

(52) U.S. Cl. .................. 324/543; 174/126.1; 138/140

(58) Field of Classification Search ................ 324/543, 324/539; 174/126.2, 126.4, 126.1
See application file for complete search history.

(56) References Cited

U.S. PATENT DOCUMENTS

| 4,905,969 | A | * | 3/1990 | Kurschner et al. ............. 256/10 |
| 5,218,171 | A | * | 6/1993 | Aldissi ..................... 174/128.1 |
| 5,339,038 | A | * | 8/1994 | Boenning et al. ........... 324/539 |
| 6,315,004 | B1 | * | 11/2001 | Wellman et al. ............ 138/146 |
| 6,710,253 | B2 | * | 3/2004 | Wildschut ................. 174/126.1 |
| 6,953,619 | B2 | * | 10/2005 | Dean et al. ............... 428/297.4 |
| 2004/0053049 | A1 | * | 3/2004 | Tsunashima et al. ........ 428/375 |
| 2004/0084797 | A1 | * | 5/2004 | Iizuka et al. ................ 264/104 |

FOREIGN PATENT DOCUMENTS

GB 2125722 A * 3/1984

* cited by examiner

*Primary Examiner*—Anjan Deb
(74) *Attorney, Agent, or Firm*—Douglas Schnabel

(57) ABSTRACT

Detectable pipe and electric fence are formed of a conductive loaded resin-based material. The conductive loaded resin-based material comprises micron conductive powder(s), conductive fiber(s), or a combination of conductive powder and conductive fibers in a base resin host. The percentage by weight of the conductive powder(s), conductive fiber(s), or a combination thereof is between about 20% and 50% of the weight of the conductive loaded resin-based material. The micron conductive powders are metals or conductive non-metals or metal plated non-metals. The micron conductive fibers may be metal fiber or metal plated fiber. Further, the metal plated fiber may be formed by plating metal onto a metal fiber or by plating metal onto a non-metal fiber. Any platable fiber may be used as the core for a non-metal fiber. Superconductor metals may also be used as micron conductive fibers and/or as metal plating onto fibers in the present invention.

28 Claims, 13 Drawing Sheets

LOW COST DETECTIBLE PIPE AND ELECTRIC FENCING MANUFACTURED FROM CONDUCTIVE LOADED RESIN-BASED MATERIALS

RELATED PATENT APPLICATIONS

This patent application claims priority to the U.S. Provisional Patent Application Ser. No. 60/638,082 filed on Dec. 21, 2004, and the U.S. Provisional Patent Application Ser. No. 60/630,587 filed on Nov. 24, 2004, which are herein incorporated by reference in their entirety.

This Patent application is a Continuation-in-Part of INT01-002CIPC, filed as U.S. patent application Ser. No. 10/877,092, filed on Jun. 25, 2004, which is a Continuation of INT01-002CIP, filed as U.S. patent application Ser. No. 10/309,429, filed on Dec. 4, 2002, now issued as U.S. Pat. No. 6,870,516, also incorporated by reference in its entirety, which is a Continuation-in-Part application of docket number INT01-002, filed as U.S. patent application Ser. No. 10/075,778, filed on Feb. 14, 2002, now issued as U.S. Pat. No. 6,741,221, which claimed priority to U.S. Provisional Patent Applications Ser. No. 60/317,808, filed on Sep. 7, 2001, Ser. No. 60/269,414, filed on Feb. 16, 2001, and Ser. No. 60/268,822, filed on Feb. 15, 2001, all of which are incorporated by reference in their entirety.

BACKGROUND OF THE INVENTION (1) Field of the Invention

This invention relates to pipe and fencing and, more particularly, to detectible pipe and electric fencing molded of conductive loaded resin-based materials comprising micron conductive powders, micron conductive fibers, or a combination thereof, substantially homogenized within a base resin when molded. This manufacturing process yields a conductive part or material usable within the EMF, thermal, acoustic, or electronic spectrum(s).

(2) Description of the Prior Art

Pipe is used in many applications for transport of fluids, such as oil or natural gas, or as a protective covering, or conduit, for electrical or telecommunications wiring. In many cases, the pipe is buried for improved safety or appearance. There are circumstances, such as during subsequent construction work, when it is necessary to precisely locate the path of the buried pipe. Location of metal pipes is typically performed using any of a variety of metal detection techniques. However, most buried natural gas pipe is constructed from a non-metal material such as polyvinyl chloride (PVC). Traditional metal detection techniques do not work for PVC pipes. To provide pipe tracing, a copper wire is typically wrapped around the PVC pipe prior to burial. The provision of this locator wire that is detectable by normal methods has at least two disadvantages. First, it is relatively easy for the wire to be broken during installation or during subsequent construction events. If the wire is broken, location techniques may not work properly. Second, the proper installation of the pipe is made more difficult due to the lack of ruggedness of the locator wire. Solving the above issues is an important object of the present invention.

Electric fence is applied mainly as a means to corral domesticated animals. In a typical application, the fence is charged with a relatively large, static voltage. When an animal contacts the fence, the voltage discharges through the animal and into the ground. The discharge shock is unpleasant for the animal but not sufficient to cause injury. The fence typically comprises conductive metal wiring that is run parallel to the ground. The prior art electric fence system has at least two disadvantages. First, depending on the type of metal wire used, corrosion of the wire surface can reduce shock capability or, in the worst case, create a risk of animal injury. Second, wire breakage will typically disable the electric shock function of an entire section of fence. Solving the above issues is an important object of the present invention.

Several prior art inventions relate to detectible or locatable pipe. U.S. Pat. No. 4,947,012 to Minarovic teaches an electro fusion marker which fuses two pipe sections together by means of an integrated heating coil. This invention also teaches that the heating coil, after it is buried, doubles as the inductor to a resonant LC circuit for locating purposes. U.S. Pat. No. 6,305,423 B1 to De Meyer et al teaches a thermoplastic or thermoset pipe that includes a conductive textile reinforcement layer for heating and leak detection purposes. U.S. Pat. No. 5,905,194 to Strong teaches a pipe line design with an integral fault detection method utilizing an inner electrically conductive layer, a layer of dielectric material, and an outer layer of a conductive coaxial element. This invention also teaches the use of time domain reflectometry (TDR) for leak detection which comprises applying a high frequency pulse to one end of the pipe line and measuring the time required for reflections of the pulse to return in order to calculate the location of the leak. In one embodiment, the inner conduit comprises PVC with a metallized outer coating. U.S. Pat. No. 5,177,996 to Sahakian teaches a coaxial liquid leak detection cable that comprises a wire conductor layer, an insulation layer impermeable by water or water vapor, a braided wire conductive layer, a second layer of water and water impermeable insulation, and an outer layer that is braided, woven, or netted in order to allow permeation by liquids. This invention also teaches that the cable be buried next to the pipe line so that any leaks in the line would permeate the cable and allow for TDR to determine its location.

U.S. Pat. No. 5,117,676 to Chang teaches a leak detector for natural gas pipelines comprising a plurality of acoustic microphones arranged along the exterior of the pipeline that are responsive to sounds generated by escaping gases through one or more holes in the pipeline. The outputs of the microphones are then monitored to determine if peaks in the acoustic spectrum occur at a predetermined wavelength of a standing wave of escaping gas. U.S. Patent Publication US 2002/0134448 A1 to Goodman teaches a locatable magnetic polyethylene gas pipe distribution system utilizing the mixing of ferrite particles into the polyethylene resin and magnetizing them during the molding process. This invention also teaches a method of directionally magnetizing the embedded ferrite particles in a distinctive spiral pattern that helps to distinguish it from background magnetic objects. U.S. Pat. No. 5,699,048 to Galloway teaches an omni-directional passive electrical marker for underground use comprising plural tuned circuits allowing for better transmission to the receiver regardless of the markers orientation in the ground. U.S. Pat. No. 6,246,328 B1 to Parkinson et al teaches an extended range passive marker comprising a wire wound planar spiral portion and a wire wound wall portion joined to the wire wound planar spiral portion and extending outward form the circumference. This invention also teaches of a hollow sphere filled with a liquid and a buoyant carrier that encases the circuits of the passive marker allowing it to orient itself for best reception and subsequent transmission underground.

Several prior art inventions relate to electric fences. U.S. Patent Publication US 2003/0066993 A1 to Chamove teaches the use of spots or stripes on an electric fencing tape to add a visual deterrent to the electric fence boundary. U.S. Pat. No. 6,710,253 B2 to Wildschut teaches an electric fence tape, rope or wire that utilizes two conductive elements with different electrical and mechanical properties woven together in a polymer fiber and a braided outer jacket. This invention also teaches the fencing will maintain a conductive ability longer than a fence that only has one conductive element. U.S. Pat. No. 6,519,131 B1 to Beck teaches an electric cattle guard comprising a first layer of non conductive flexible natural or synthetic rubber and a second layer of the same material that has a plurality of electrically conductive particles, fibers or a mixture thereof. This invention also teaches the conductive filler to be either carbon black or graphite or a metal such as aluminum, copper, nickel, tin or stainless steel in either fibers or powders.

U.S. Pat. No. 6,513,793 B2 to Bellon teaches an electric fence that utilizes two conductive elements with different mechanical and electrical properties. The first conductive element that is used has excellent mechanical properties against breakage and corrosion and the second conductive element is highly conductive and covered for most of the distance by a sheath to protect against breakage and corrosion. This invention then teaches that the two conductive elements are joined by a metal connector at intervals along the fencing to insure a strong conductive path. U.S. Pat. No. 6,341,550 B1 to White teaches an electric braided fence that utilizes a non conductive inner core of a high strength synthetic yarn and an outer conductive braided shell of either copper wire or copper coated wire or a copper alloy braided along with a highly visible polyester fiber. U.S. Pat. No. 6,472,602 B1 to Pokrandt teaches an electric fence line that utilizes a woven tape of electrically conductive stainless steel strands and a polyethylene monofilament yarn that run longitudinally along the tape and a stainless steel bonding strand that zigzags across the tape at intervals to insure a strong conductive path along the entire length of the tape. U.S. Pat. No. 5,096,162 to Cleveland teaches an electric fence wire construction that utilizes an elongated plastic strip folded over parallel conductive wires in order to have an electric fence that visually looks like a rail fence system. This invention teaches that the elongated plastic strip has a tooth like pattern on the edge so that the conductive wire element is exposed.

SUMMARY OF THE INVENTION

A principal object of the present invention is to provide an effective locatable pipe.

Another principal object of the present invention is to provide an effective electric fence.

A further object of the present invention is to provide a locatable pipe that is robust for buried pipe installation.

A further object of the present invention is to provide a non-metal pipe that is locatable via metal detection methods.

A further object of the present invention is to provide an electric fence that is not susceptible to corrosion.

A further object of the present invention is to provide an electric fence that will work properly even if partially damaged.

A further object of the present invention is to provide a method to form an effective locatable pipe.

A further object of the present invention is to provide a method to form an effective electric fence.

A further object of the present invention is to provide a locatable pipe and electric fence molded of conductive loaded resin-based materials.

A yet further object of the present invention is to provide locatable pipe and electric fence molded of conductive loaded resin-based material where the electrical and thermal characteristics can be altered or the visual characteristics can be altered by forming a metal layer over the conductive loaded resin-based material.

A yet further object of the present invention is to provide a method to fabricate an electric fence from a conductive loaded resin-based material where the material is in the form of a fabric.

In accordance with the objects of this invention, a detectable pipe device is achieved. The device comprises a hollow sleeve having a first opening and a second opening. The hollow shell comprises a first layer of non-conductive material and a second layer of conductive material. The second layer comprises conductive loaded, resin-based material comprising conductive materials in a base resin host.

Also in accordance with the objects of this invention, an electric fence device is achieved. The device comprises a voltage source and a plurality of conductors. The conductors comprise conductive material comprising conductive loaded, resin-based material comprising conductive materials in a base resin host.

Also in accordance with the objects of this invention, an electric fence device is achieved. The device comprises a voltage source and a plurality of conductors. The conductors comprise conductive material comprising conductive loaded, resin-based material comprising micron conductive fiber in a base resin host.

BRIEF DESCRIPTION OF THE DRAWINGS

In the accompanying drawings forming a material part of this description, there is shown.

DESCRIPTION OF THE PREFERRED EMBODIMENTS

Figure 1:
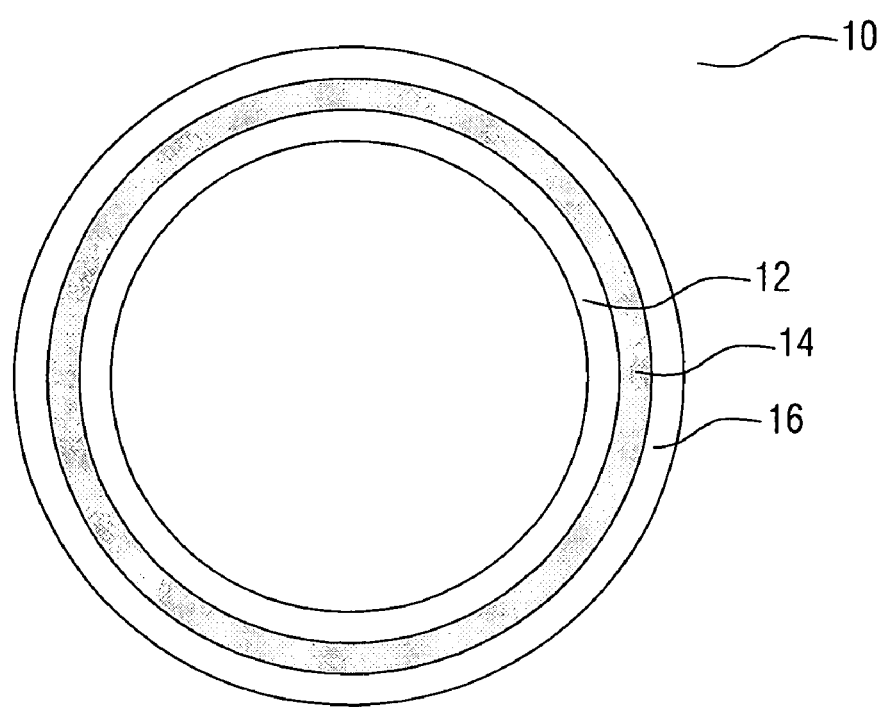
FIG. 1 illustrates a first preferred embodiment of the present invention showing a pipe structure formed in part of a conductive loaded resin-based material.

This invention relates to locatable pipe and electric fence molded of conductive loaded resin-based materials comprising micron conductive powders, micron conductive fibers, or a combination thereof, substantially homogenized within a base resin when molded.

The conductive loaded resin-based materials of the invention are base resins loaded with conductive materials, which then makes any base resin a conductor rather than an insulator. The resins provide the structural integrity to the molded part. The micron conductive fibers, micron conductive powders, or a combination thereof, are substantially homogenized within the resin during the molding process, providing the electrical, thermal, and/or acoustical continuity.

The conductive loaded resin-based materials can be molded, extruded or the like to provide almost any desired shape or size. The molded conductive loaded resin-based materials can also be cut, stamped, or vacuumed formed from an injection molded or extruded sheet or bar stock, over-molded, laminated, milled or the like to provide the desired shape and size. The thermal or electrical conductivity characteristics of locatable pipe and electric fence fabricated using conductive loaded resin-based materials depend on the composition of the conductive loaded resin-based materials, of which the loading or doping parameters can be adjusted, to aid in achieving the desired structural, electrical or other physical characteristics of the material. The selected materials used to fabricate the devices are substantially homogenized together using molding techniques and or methods such as injection molding, over-molding, insert molding, compression molding, thermo-set, protrusion, extrusion, calendaring, or the like. Characteristics related to 2D, 3D, 4D, and 5D designs, molding and electrical characteristics, include the physical and electrical advantages that can be achieved during the molding process of the actual parts and the polymer physics associated within the conductive networks within the molded part(s) or formed material(s).

In the conductive loaded resin-based material, electrons travel from point to point when under stress, following the path of least resistance. Most resin-based materials are insulators and represent a high resistance to electron passage. The doping of the conductive loading into the resin-based material alters the inherent resistance of the polymers. At a threshold concentration of conductive loading, the resistance through the combined mass is lowered enough to allow electron movement. Speed of electron movement depends on conductive loading concentration, that is, the separation between the conductive loading particles. Increasing conductive loading content reduces interparticle separation distance, and, at a critical distance known as the percolation point, resistance decreases dramatically and electrons move rapidly.

Resistivity is a material property that depends on the atomic bonding and on the microstructure of the material. The atomic microstructure material properties within the conductive loaded resin-based material are altered when molded into a structure. A substantially homogenized conductive microstructure of delocalized valance electrons is created. This microstructure provides sufficient charge carriers within the molded matrix structure. As a result, a low density, low resistivity, lightweight, durable, resin based polymer microstructure material is achieved. This material exhibits conductivity comparable to that of highly conductive metals such as silver, copper or aluminum, while maintaining the superior structural characteristics found in many plastics and rubbers or other structural resin based materials.

The use of conductive loaded resin-based materials in the fabrication of locatable pipe and electric fence significantly lowers the cost of materials and the design and manufacturing processes used to hold ease of close tolerances, by forming these materials into desired shapes and sizes. The devices can be manufactured into infinite shapes and sizes using conventional forming methods such as injection molding, over-molding, compression molding, thermoset molding, or extrusion, calendaring, or the like. The conductive loaded resin-based materials, when molded, typically but not exclusively produce a desirable usable range of resistivity of less than about 5 to more than about 25 ohms per square, but other resistivities can be achieved by varying the doping parameters and/or resin selection(s).

The conductive loaded resin-based materials comprise micron conductive powders, micron conductive fibers, or any combination thereof, which are substantially homogenized together within the base resin, during the molding process, yielding an easy to produce low cost, electrically conductive, close tolerance manufactured part or circuit. The resulting molded article comprises a three dimensional, continuous network of conductive loading and polymer matrix. Exemplary micron conductive powders include carbons, graphites, amines, eeonomers, or the like, and/or of metal powders such as nickel, copper, silver, aluminum, nichrome, or plated or the like. The use of carbons or other forms of powders such as graphite(s) etc. can create additional low level electron exchange and, when used in combination with micron conductive fibers, creates a micron filler element within the micron conductive network of fiber(s) producing further electrical conductivity as well as acting as a lubricant for the molding equipment. Carbon nano-tubes may be added to the conductive loaded resin-based material. The addition of conductive powder to the micron conductive fiber loading may increase the surface conductivity of the molded part, particularly in areas where a skinning effect occurs during molding.

The micron conductive fibers may be metal fiber or metal plated fiber. Further, the metal plated fiber may be formed by plating metal onto a metal fiber or by plating metal onto a non-metal fiber. Exemplary metal fibers include, but are not limited to, stainless steel fiber, copper fiber, nickel fiber, silver fiber, aluminum fiber, nichrome fiber, or the like, or combinations thereof. Exemplary metal plating materials include, but are not limited to, copper, nickel, cobalt, silver, gold, palladium, platinum, ruthenium, rhodium, and nichrome, and alloys of thereof. Any platable fiber may be used as the core for a non-metal fiber. Exemplary non-metal fibers include, but are not limited to, carbon, graphite, polyester, basalt, melamine, man-made and naturally-occurring materials, and the like. In addition, superconductor metals, such as titanium, nickel, niobium, and zirconium, and alloys of titanium, nickel, niobium, and zirconium may also be used as micron conductive fibers and/or as metal plating onto fibers in the present invention.

Where micron fiber is combined with base resin, the micron fiber may be pretreated to improve performance. According to one embodiment of the present invention, the fibers are subjected to any or several chemical modifications in order to improve the fibers interfacial properties. Fiber modification processes include, but are not limited to: mercerization; peroxide treatment; benzoylation; and amino, silane or other chemical or polymer treatments. The fiber modification processes are useful for improved the interfacial adhesion, improved wetting during homogenization and/or reduced oxide growth when compared to non-treated fiber.

The structural material may be any polymer resin or combination of polymer resins. Non-conductive resins or inherently conductive resins may be used as the structural material. Conjugated polymer resins, complex polymer resins, and/or inherently conductive resins may be used as the structural material. The dielectric properties of the resin-based material will have a direct effect upon the final electrical performance of the conductive loaded resin-based material. Many different dielectric properties are possible depending on the chemical makeup and/or arrangement, such as linking, cross-linking or the like, of the polymer, co-polymer, monomer, ter-polymer, or homo-polymer material. Structural material can be, here given as examples and not as an exhaustive list, polymer resins produced by GE PLASTICS, Pittsfield, Mass., a range of other plastics produced by GE PLASTICS, Pittsfield, Mass., a range of other plastics produced by other manufacturers, silicones produced by GE SILICONES, Waterford, N.Y., or other flexible resin-based rubber compounds produced by other manufacturers.

The resin-based structural material loaded with micron conductive powders, micron conductive fibers, or in combination thereof can be molded, using conventional molding methods such as injection molding or over-molding, or extrusion, or compression molding, thermoset molding, or calendaring, to create desired shapes and sizes. The molded conductive loaded resin-based materials can also be stamped, cut or milled as desired to form create the desired shape form factor(s) of the locatable pipe and electric fence. The doping composition and directionality associated with the micron conductors within the loaded base resins can affect the electrical and structural characteristics of the devices and can be precisely controlled by mold designs, gating and or protrusion design(s) and or during the molding process itself. In addition, the resin base can be selected to obtain the desired thermal characteristics such as very high melting point or specific thermal conductivity.

A resin-based sandwich laminate could also be fabricated with random or continuous webbed micron stainless steel fibers or other conductive fibers, forming a cloth like material. The webbed conductive fiber can be laminated or the like to materials such as Teflon, Polyesters, or any resin-based flexible or solid material(s), which when discretely designed in fiber content(s), orientation(s) and shape(s), will produce a very highly conductive flexible cloth-like material. Such a cloth-like material could also be used in forming devices that could be embedded in a person's clothing as well as other resin materials such as rubber(s) or plastic(s). When using conductive fibers as a webbed conductor as part of a laminate or cloth-like material, the fibers may have diameters of between about 3 and 12 microns, typically between about 8 and 12 microns or in the range of about 10 microns, with length(s) that can be seamless or overlapping.

The conductive loaded resin-based material may also be formed into a prepreg laminate, cloth, or webbing. A laminate, cloth, or webbing of the conductive loaded resin-based material is first impregnated with a resin-based material. In various embodiments, the conductive loaded resin-based material is dipped, coated, sprayed, and/or extruded with resin-based material to cause the laminate, cloth, or webbing to adhere together in a prepreg grouping that is easy to handle. This prepreg is placed, or laid up, onto a form and is then heated to form a permanent bond. In another embodiment, the prepreg is laid up onto the impregnating resin while the resin is still wet and is then cured by heating or other means. In another embodiment, the wet lay-up is performed by laminating the conductive loaded resin-based prepreg over a honeycomb structure. In yet another embodiment, a wet prepreg is formed by spraying, dipping, or coating the conductive loaded resin-based material laminate, cloth, or webbing in high temperature capable paint.

Carbon fiber and resin-based composites are found to display unpredictable points of failure. In carbon fiber systems there is no elongation of the structure. By comparison, in the present invention, the conductive loaded resin-based material displays greater strength in the direction of elongation. As a result a structure formed of the conductive loaded resin-based material of the present invention will hold together even if crushed while a comparable carbon fiber composite will break into pieces.

The conductive loaded resin-based material of the present invention can be made resistant to corrosion and/or metal electrolysis by selecting micron conductive fiber and/or micron conductive powder and base resin that are resistant to corrosion and/or metal electrolysis. For example, if a corrosion/electrolysis resistant base resin is combined with stainless steel fiber and carbon fiber/powder, then a corrosion and/or metal electrolysis resistant conductive loaded resin-based material is achieved. Another additional and important feature of the present invention is that the conductive loaded resin-based material of the present invention may be made flame retardant. Selection of a flame-retardant (FR) base resin material allows the resulting product to exhibit flame retardant capability. This is especially important in locatable pipe and electric fence applications as described herein.

The substantially homogeneous mixing of micron conductive fiber and/or micron conductive powder and base resin described in the present invention may also be described as doping. That is, the substantially homogeneous mixing converts the typically non-conductive base resin material into a conductive material. This process is analogous to the doping process whereby a semiconductor material, such as silicon, can be converted into a conductive material through the introduction of donor/acceptor ions as is well known in the art of semiconductor devices. Therefore, the present invention uses the term doping to mean converting a typically non-conductive base resin material into a conductive material through the substantially homogeneous mixing of micron conductive fiber and/or micron conductive powder into a base resin.

As an additional and important feature of the present invention, the molded conductor loaded resin-based material exhibits excellent thermal dissipation characteristics. Therefore, locatable pipe and electric fence manufactured from the molded conductor loaded resin-based material can provide added thermal dissipation capabilities to the application. For example, heat can be dissipated from electrical devices physically and/or electrically connected to a device of the present invention.

As a significant advantage of the present invention, locatable pipe and electric fence constructed of the conductive loaded resin-based material can be easily interfaced to an electrical circuit or grounded. In one embodiment, a wire can be attached to a conductive loaded resin-based article via a screw that is fastened to the article. For example, a simple sheet-metal type, self tapping screw, when fastened to the material, can achieve excellent electrical connectivity via the conductive matrix of the conductive loaded resin-based material. To facilitate this approach a boss may be molded into the conductive loaded resin-based material to accommodate such a screw. Alternatively, if a solderable screw material, such as copper, is used, then a wire can be soldered to the screw that is embedded into the conductive loaded resin-based material. In another embodiment, the conductive loaded resin-based material is partly or completely plated with a metal layer. The metal layer forms excellent electrical conductivity with the conductive matrix. A connection of this metal layer to another circuit or to ground is then made. For example, if the metal layer is solderable, then a soldered connection may be made between the article and a grounding wire.

Where a metal layer is formed over the surface of the conductive loaded resin-based material, any of several techniques may be used to form this metal layer. This metal layer may be used for visual enhancement of the molded conductive loaded resin-based material article or to otherwise alter performance properties. Well-known techniques, such as electroless metal plating, electro plating, electrolytic metal plating, sputtering, metal vapor deposition, metallic painting, or the like, may be applied to the formation of this metal layer. If metal plating is used, then the resin-based structural material of the conductive loaded, resin-based material is one that can be metal plated. There are many of the polymer resins that can be plated with metal layers. For example, GE Plastics, SUPEC, VALOX, ULTEM, CYCOLAC, UGIKRAL, STYRON, CYCOLOY are a few resin-based materials that can be metal plated. Electroless plating is typically a multiple-stage chemical process where, for example, a thin copper layer is first deposited to form a conductive layer. This conductive layer is then used as an electrode for the subsequent plating of a thicker metal layer.

A typical metal deposition process for forming a metal layer onto the conductive loaded resin-based material is vacuum metallization. Vacuum metallization is the process where a metal layer, such as aluminum, is deposited on the conductive loaded resin-based material inside a vacuum chamber. In a metallic painting process, metal particles, such as silver, copper, or nickel, or the like, are dispersed in an acrylic, vinyl, epoxy, or urethane binder. Most resin-based materials accept and hold paint well, and automatic spraying systems apply coating with consistency. In addition, the excellent conductivity of the conductive loaded resin-based material of the present invention facilitates the use of extremely efficient, electrostatic painting techniques.

The conductive loaded resin-based material can be contacted in any of several ways. In one embodiment, a pin is embedded into the conductive loaded resin-based material by insert molding, ultrasonic welding, pressing, or other means. A connection with a metal wire can easily be made to this pin and results in excellent contact to the conductive loaded resin-based material. In another embodiment, a hole is formed in to the conductive loaded resin-based material either during the molding process or by a subsequent process step such as drilling, punching, or the like. A pin is then placed into the hole and is then ultrasonically welded to form a permanent mechanical and electrical contact. In yet another embodiment, a pin or a wire is soldered to the conductive loaded resin-based material. In this case, a hole is formed in the conductive loaded resin-based material either during the molding operation or by drilling, stamping, punching, or the like. A solderable layer is then formed in the hole. The solderable layer is preferably formed by metal plating. A conductor is placed into the hole and then mechanically and electrically bonded by point, wave, or reflow soldering.

Another method to provide connectivity to the conductive loaded resin-based material is through the application of a solderable ink film to the surface. One exemplary solderable ink is a combination of copper and solder particles in an epoxy resin binder. The resulting mixture is an active, screen-printable and dispensable material. During curing, the solder reflows to coat and to connect the copper particles and to thereby form a cured surface that is directly solderable without the need for additional plating or other processing steps. Any solderable material may then be mechanically and/or electrically attached, via soldering, to the conductive loaded resin-based material at the location of the applied solderable ink. Many other types of solderable inks can be used to provide this solderable surface onto the conductive loaded resin-based material of the present invention. Another exemplary embodiment of a solderable ink is a mixture of one or more metal powder systems with a reactive organic medium. This type of ink material is converted to solderable pure metal during a low temperature cure without any organic binders or alloying elements.

A ferromagnetic conductive loaded resin-based material may be formed of the present invention to create a magnetic or magnetizable form of the material. Ferromagnetic micron conductive fibers and/or ferromagnetic conductive powders are mixed with the base resin. Ferrite materials and/or rare earth magnetic materials are added as a conductive loading to the base resin. With the substantially homogeneous mixing of the ferromagnetic micron conductive fibers and/or micron conductive powders, the ferromagnetic conductive loaded resin-based material is able to produce an excellent low cost, low weight magnetize-able item. The magnets and magnetic devices of the present invention can be magnetized during or after the molding process. The magnetic strength of the magnets and magnetic devices can be varied by adjusting the amount of ferromagnetic micron conductive fibers and/or ferromagnetic micron conductive powders that are incorporated with the base resin. By increasing the amount of the ferromagnetic doping, the strength of the magnet or magnetic devices is increased. The substantially homogenous mixing of the conductive fiber network allows for a substantial amount of fiber to be added to the base resin without causing the structural integrity of the item to decline. The ferromagnetic conductive loaded resin-based magnets display the excellent physical properties of the base resin, including flexibility, moldability, strength, and resistance to environmental corrosion, along with excellent magnetic ability. In addition, the unique ferromagnetic conductive loaded resin-based material facilitates formation of items that exhibit excellent thermal and electrical conductivity as well as magnetism.

A high aspect ratio magnet is easily achieved through the use of ferromagnetic conductive micron fiber or through the combination of ferromagnetic micron powder with conductive micron fiber. The use of micron conductive fiber allows for molding articles with a high aspect ratio of conductive fiber to cross sectional area. If a ferromagnetic micron fiber is used, then this high aspect ratio translates into a high quality magnetic article. Alternatively, if a ferromagnetic micron powder is combined with micron conductive fiber, then the magnetic effect of the powder is effectively spread throughout the molded article via the network of conductive fiber such that an effective high aspect ratio molded magnetic article is achieved. The ferromagnetic conductive loaded resin-based material may be magnetized, after molding, by exposing the molded article to a strong magnetic field. Alternatively, a strong magnetic field may be used to magnetize the ferromagnetic conductive loaded resin-based material during the molding process.

The ferromagnetic conductive loading is in the form of fiber, powder, or a combination of fiber and powder. The micron conductive powder may be metal fiber or metal plated fiber. If metal plated fiber is used, then the core fiber is a platable material and may be metal or non-metal. Exemplary ferromagnetic conductive fiber materials include ferrite, or ceramic, materials as nickel zinc, manganese zinc, and combinations of iron, boron, and strontium, and the like. In addition, rare earth elements, such as neodymium and samarium, typified by neodymium-iron-boron, samarium-cobalt, and the like, are useful ferromagnetic conductive fiber materials. Exemplary ferromagnetic micron powder leached onto the conductive fibers include ferrite, or ceramic, materials as nickel zinc, manganese zinc, and combinations of iron, boron, and strontium, and the like. In addition, rare earth elements, such as neodymium and samarium, typified by neodymium-iron-boron, samarium-cobalt, and the like, are useful ferromagnetic conductive powder materials. A ferromagnetic conductive loading may be combined with a non-ferromagnetic conductive loading to form a conductive loaded resin-based material that combines excellent conductive qualities with magnetic capabilities.

Referring now to FIG. 1, a first preferred embodiment of the present invention is illustrated. A pipe 10 is shown in cross-sectional representation. In this embodiment the pipe 10 comprises, in part, the conductive loaded resin-based material of the present invention. In particular, the pipe 10 comprises an inner layer 12 of a non conductive resin-based material such as PVC, a conductive layer 14 comprising the conductive loaded resin-based material of the present invention, and a third outer layer 16 of the non conductive resin-based material. In one embodiment, the pipe 10 is formed by co-extruding the conductive layer 14 of the conductive loaded resin-based material of the present invention and the third outer layer 16 of a non conductive resin-based material with the inner layer 12 of non conductive resin-based material. In another embodiment, the pipe 10 is formed by over-molding the conductive layer 14 of the conductive loaded resin-based material and the third outer layer 16 onto the inner layer 12 of non conductive resin-based material.

The novel pipe 10 is particularly useful because, when buried, it can be remotely detected using various techniques. In one technique, current is conducted through the conductive layer 14 of the pipe 10 to generate a detectible electromagnetic field. The conductive ability of the conductive loaded resin-based material 14 allows a current to be sustained without the use of an external wire. In another technique, a metal detector can be used to detect the pipe location due to metallic conductive loading of the conductive loaded resin-based material. The pipe 10 and pipe detection structure 14 of the present invention increases the detectable conductive footprint of the pipe to thereby reduce locating errors. The construction allows the pipe 10 utilize the material properties of the inner layer 12 for liquid transport while integrating the needed detection function via the conductive loaded resin-based layer 14.

Figure 7:
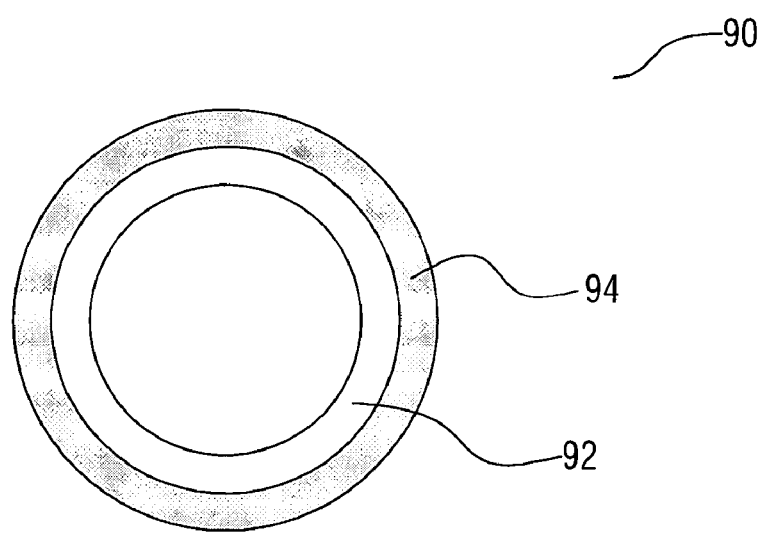
FIG. 7 illustrates a second preferred embodiment of the present invention showing a pipe structure formed in part of a conductive loaded resin-based material according to a second preferred embodiment of the present invention.

Referring now to FIG. 7, a second preferred embodiment of the present invention is illustrated. Another pipe 90 is shown in cross-sectional representation. In this embodiment the pipe 90 comprises, in part, the conductive loaded resin-based material of the present invention. In particular, the pipe 90 comprises an inner layer 92 of a non conductive resin-based material such as PVC and a conductive layer 94 of the conductive loaded resin-based material of the present invention. In one embodiment, the pipe 90 is formed by co-extruding the conductive layer 94 of the conductive loaded resin-based material of the present invention with the inner layer 92 of non conductive resin-based material. In another embodiment, the pipe 90 is formed by over-molding the conductive layer 94 of the conductive loaded resin-based material onto the inner layer 92 of non conductive resin-based material. The novel pipe 90 in this embodiment shares the same capability for underground detection as the pipe 10 described in the first preferred embodiment but is not insulated. Therefore, when transporting flammable materials such as natural gas and electrical isolation from stray current sources is desired, the first preferred embodiment is recommended. Where electrical isolation from an external source is not needed, then the second embodiment is preferred.

Figure 8:
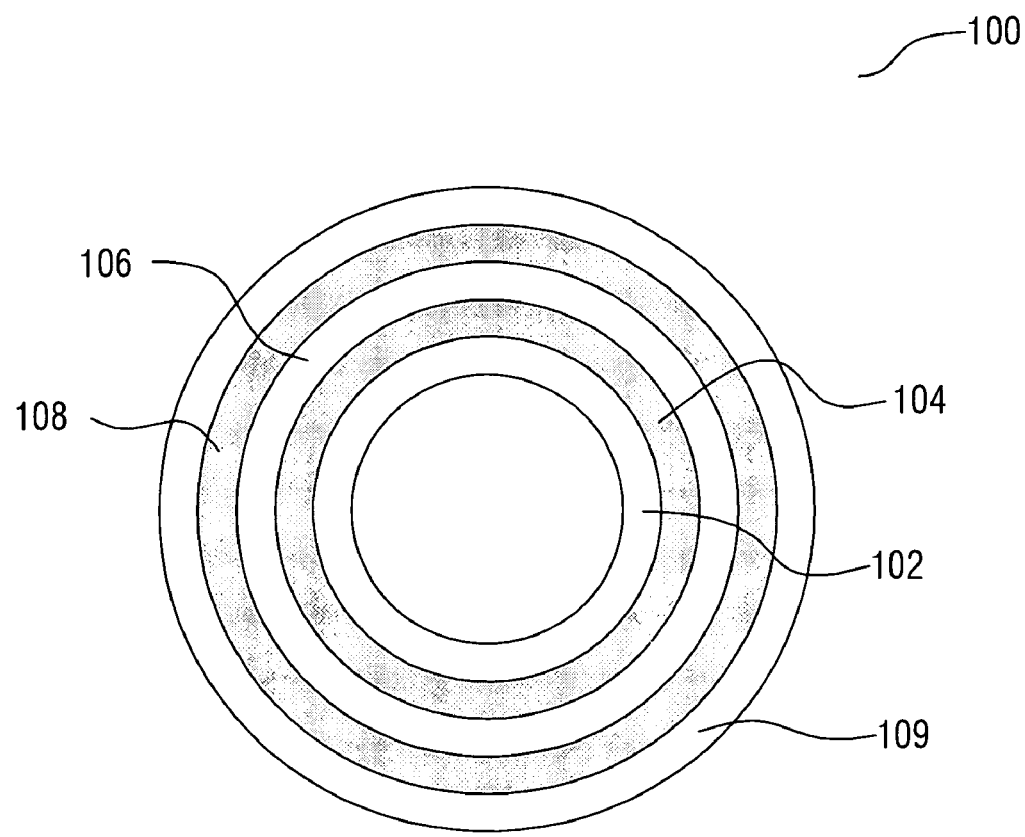
FIG. 8 illustrates a third preferred embodiment of the present invention showing a pipe structure formed in part of a conductive loaded resin-based material according to a third preferred embodiment of the present invention.

Referring now to FIG. 8, a third preferred embodiment of the present invention is illustrated. Yet another pipe 100 is shown in cross-sectional representation. In this embodiment the pipe 100 comprises, in part, the conductive loaded resin-based material of the present invention. In particular, the pipe 100 comprises an inner layer 102 of a non conductive resin-based material such as PVC, a secondary layer 104 of the conductive loaded resin-based material of the present invention, a third layer 106 of a non conductive resin-based material, a fourth layer 108 of conductive loaded resin-based material, and a fifth outer layer 109 of a non conductive resin-based material. In one embodiment, the pipe 100 is formed by co-extruding the second, third, fourth, and fifth layers of 104, 106, 108, and 109 with the inner layer 102. In another embodiment the pipe 100 is formed by over-molding the second, third, fourth, and fifth layers of 104, 106, 108, and 109 over the inner layer 102.

The novel pipe 100 in this embodiment possesses the same characteristics of detection ability as the previously mentioned preferred embodiments. This pipe 100, however, also lends itself to a method of leak detection and location known as time domain reflectometry or (TDR). TDR is a method of transmitting a pulse of energy through a conductor and measuring the amount of time it takes to return. When the pipe 100 in this embodiment begins to leak, the fluid leaking from the pipe will cause a contact point between the second layer 104 of conductive loaded resin-based material and the fourth layer 108 of conductive loaded resin-based material. The TDR method can determine the distance from a starting location to the leak location so that the correct location of the pipe can be repaired.

Figure 9:
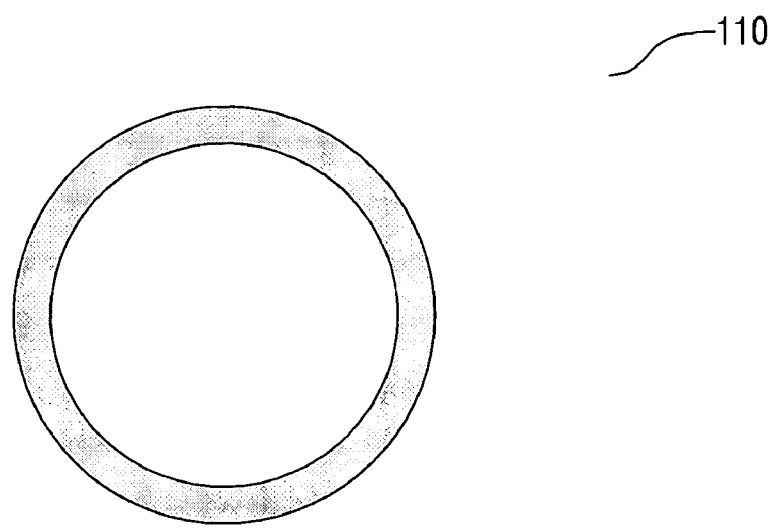
FIG. 9 illustrates a fourth preferred embodiment of the present invention showing a pipe structure formed in part of a conductive loaded resin-based material according to a fourth preferred embodiment of the present invention.

Referring now to FIG. 9, a fourth preferred embodiment of the present invention is illustrated. Another pipe 110 is shown in cross-sectional representation. In this embodiment the pipe 110 comprises only the conductive loaded resin-based material of the present invention. In particular, the pipe 110 is formed in its entirety of the conductive loaded resin-based material. In this embodiment the pipe 110 is formed by extrusion. The novel pipe 110 is especially useful in underground applications where antistatic capability is needed and where the conductive loaded resin-based material is sufficiently non-reactive with the transported fluid.

Figure 10:
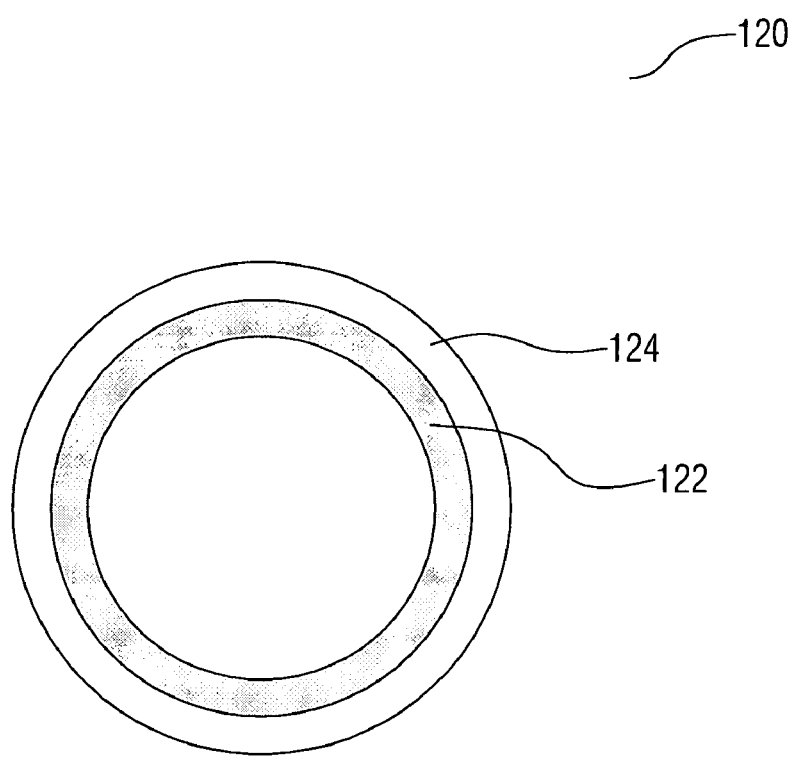
FIG. 10 illustrates a fifth preferred embodiment of the present invention showing a pipe structure formed in part of a conductive loaded resin-based material according to a fifth preferred embodiment of the present invention.

Referring now to FIG. 10, a fifth preferred embodiment of the present invention is illustrated. Another pipe 120 is shown in cross-sectional representation. In this embodiment the pipe 120 comprises, in part, the conductive loaded resin-based material of the present invention. In particular, the pipe 120 comprises an inner layer 122 of the conductive loaded resin-based material of the present invention and an outer layer 124 of a non conductive resin-based material. In one embodiment the outer layer 124 is formed over the inner layer 122 by co-extrusion. In another embodiment the outer layer 124 is over molded onto the inner layer 122. The novel pipe 120 is also useful in underground applications where an antistatic inner layer is needed, where the conductive loaded resin-based material is sufficiently non-reactive with the transported fluid, and where electrical isolation from stray current sources is desired.

Figure 11:
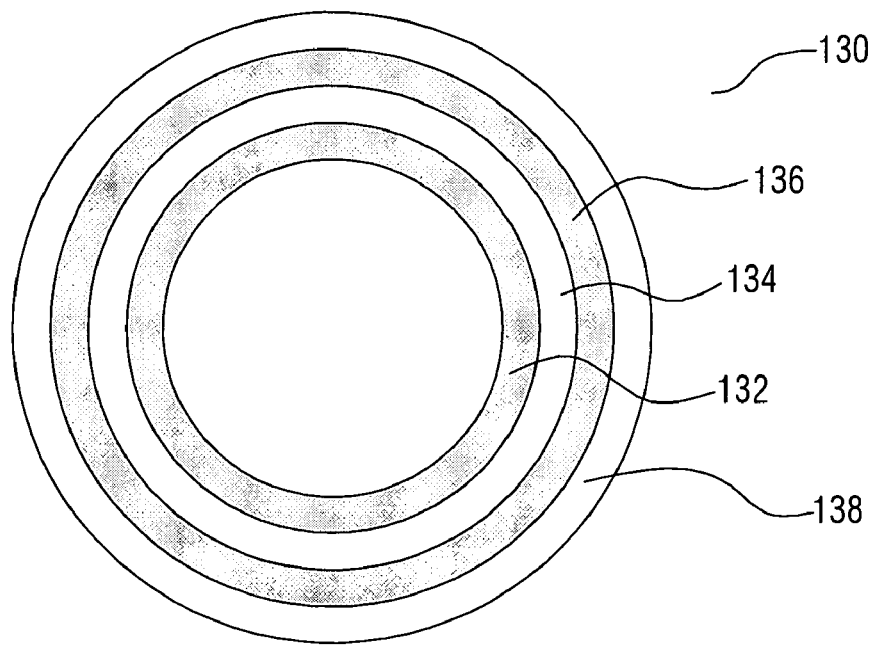
FIG. 11 illustrates a sixth preferred embodiment of the present invention showing a pipe structure formed in part of a conductive loaded resin-based material according to a sixth preferred embodiment of the present invention.

Referring now to FIG. 11, a sixth preferred embodiment of the present invention is illustrated. Yet another pipe 130 is shown in cross-sectional representation. The pipe 130 comprises, in part, the conductive loaded resin-based material of the present invention. In particular, the pipe 130 comprises an inner layer 132 of conductive loaded resin-based material, a second layer 134 of a non conductive resin-based material, a third layer 136 of conductive loaded resin-based material, and a fourth outer layer 138 of non conductive resin-based material. In one embodiment, the pipe 130 is formed by co-extruding the second, third, and fourth layers of 134, 136, and 138 with the inner layer 132. In another embodiment the pipe 130 is formed by over-molding the second, third and fourth layers of 134, 136, and 138 over the inner layer 102. The pipe 130 in this embodiment is useful in underground applications where an antistatic inner layer is needed, where the conductive loaded resin-based material is sufficiently non-reactive with the transported fluid, where the electrical insulation from stray current sources, and where leak detection with TDR capabilities is desired.

Figure 12:
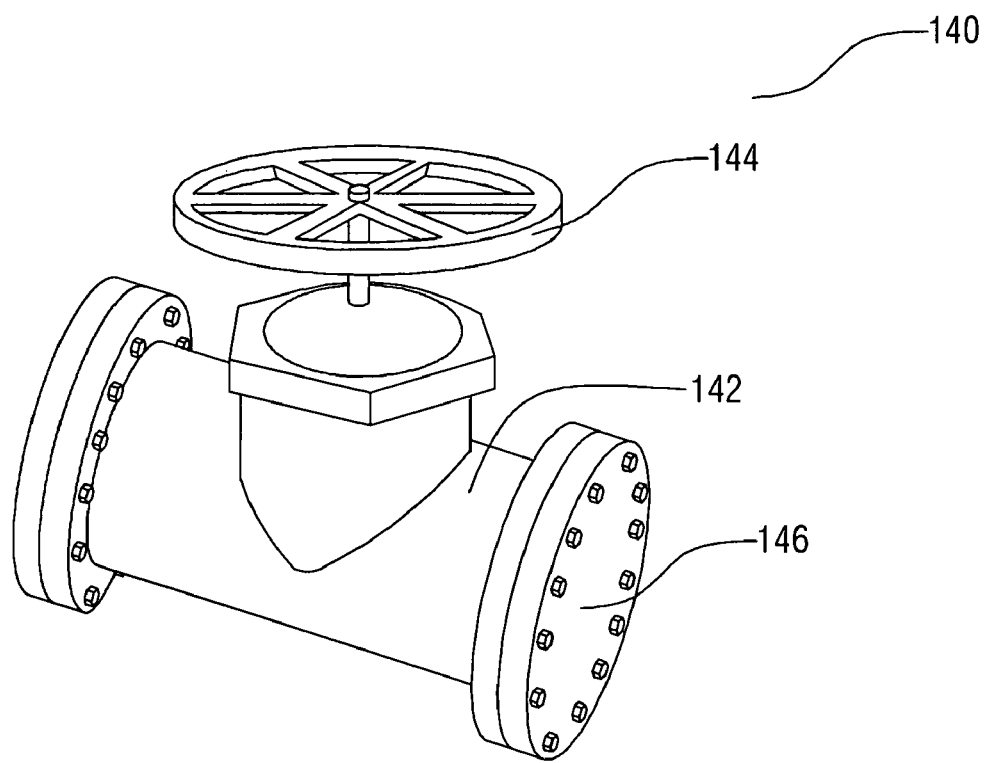
FIG. 12 illustrates a seventh preferred embodiment of the present invention showing a pipe structure formed in part of a conductive loaded resin-based material according to a seventh preferred embodiment of the present invention.
Figure 13:
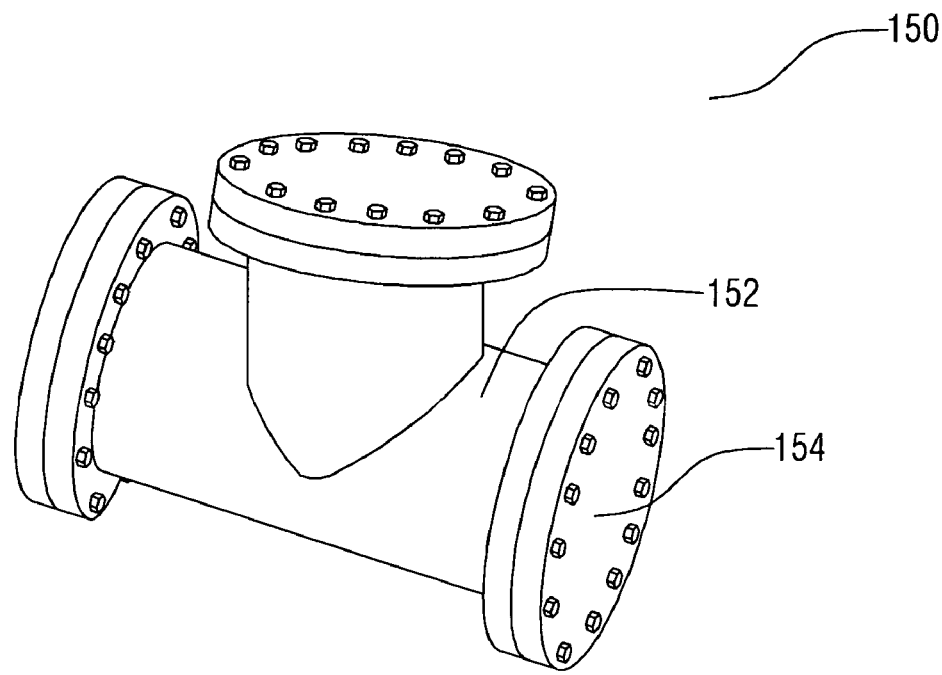
FIG. 13 illustrates an eighth preferred embodiment of the present invention showing a pipe structure formed in part of a conductive loaded resin-based material according to an eighth preferred embodiment of the present invention.
Figure 14:
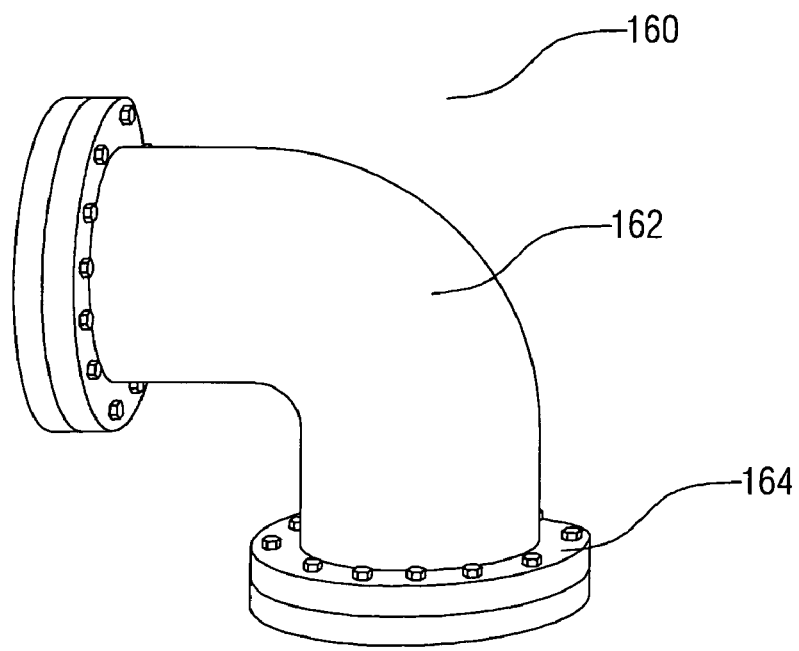
FIG. 14 illustrates a ninth preferred embodiment of the present invention showing a pipe structure formed in part of a conductive loaded resin-based material according to a ninth preferred embodiment of the present invention.
Figure 15:
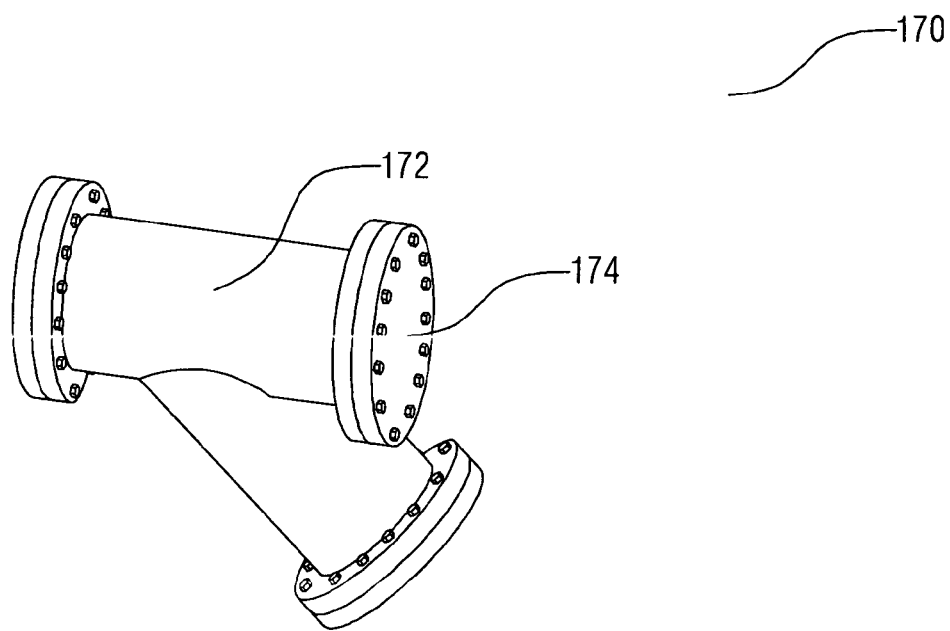
FIG. 15 illustrates a tenth preferred embodiment of the present invention showing a pipe structure formed in part of a conductive loaded resin-based material according to a tenth preferred embodiment of the present invention.
Figure 16:
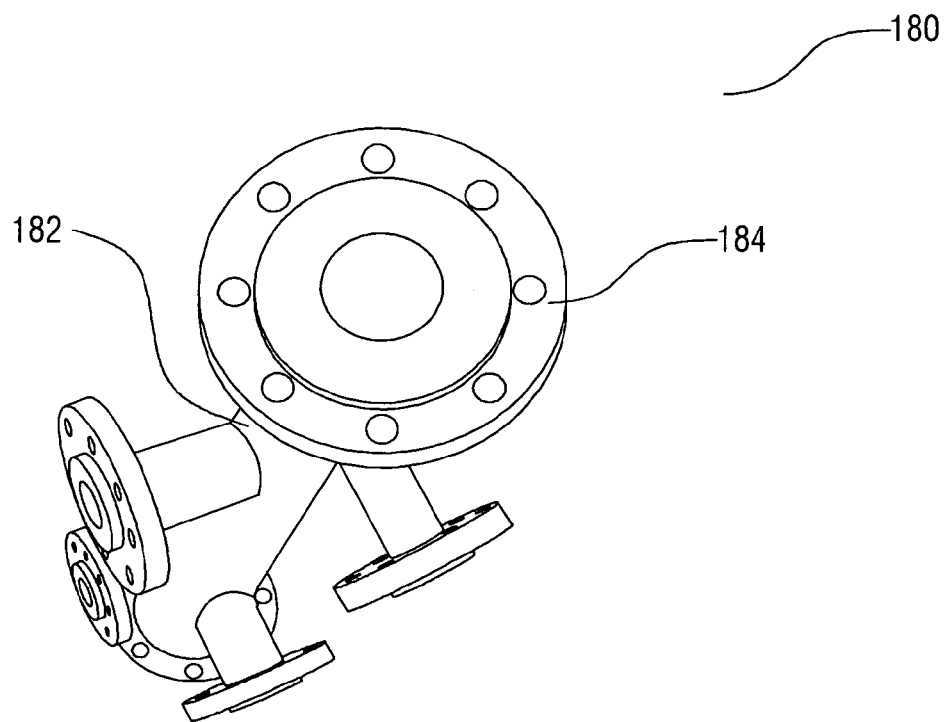
FIG. 16 illustrates an eleventh preferred embodiment of the present invention showing a pipe structure formed in part of a conductive loaded resin-based material according to an eleventh preferred embodiment of the present invention.

Referring now to FIGS. 12 through 16, seventh through eleventh preferred embodiments of the present invention are illustrated. Pipe structure components shown in FIGS. 12 through 16 comprise the conductive loaded resin-based material of the present invention. The pipe structure components in FIGS. 12 through 16 are representative of many numerous types of pipe connecting and or regulating devices and could be formed by any of the previously mentioned preferred embodiment methods. More specifically, FIG. 12 illustrates a valve 140 comprising a handle 144, a valve body 142, and end plates 146 arranged to allow controlled flow through the valve 140. Any or all of these components comprise the conductive loaded resin-based material according to various embodiments of the present invention. Referring again to FIG. 13, connector a T-connector 150 is illustrated. The connector comprises a connector body 152 and end plates 154. Any or all of these components comprise the conductive loaded resin-based material according to various embodiments of the present invention. Referring now to FIG. 14, an elbow connector 160 is illustrated. The elbow connector 160 comprises a body 162 and end plates 164. Any or all of these components comprise the conductive loaded resin-based material according to various embodiments of the present invention. Referring now to FIG. 15, a Y-connector 170 is illustrated. The connector 170 comprise a body 172 and end plates 174. Any or all of these components comprise the conductive loaded resin-based material according to various embodiments of the present invention. Referring now to FIG. 16, a manifold connection 180 is illustrated. The connection comprises a body 182 and end plates 184. Any or all of these components comprise the conductive loaded resin-based material according to various embodiments of the present invention. All of the above mentioned pipe structure components in FIGS. 12 through 16 share the same capability for underground detection as the previously mentioned preferred embodiments.

Figure 17:
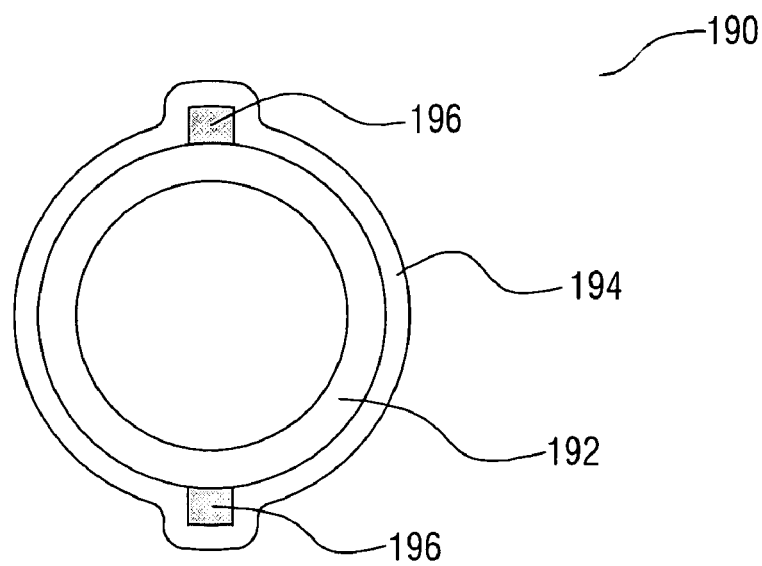
FIG. 17 illustrates a twelfth preferred embodiment of the present invention showing a pipe structure formed in part of a conductive loaded resin-based material according to a twelfth preferred embodiment of the present invention.

Referring now to FIG. 17, a twelfth preferred embodiment of the present invention is illustrated. Another pipe 190 is shown in cross-sectional representation. The pipe 190 comprises, in part, the conductive loaded resin-based material of the present invention. In particular, the pipe 190 comprises an inner layer 192 of a non conductive resin-based material such as PVC, and at least one linear conductive stripe 196 of conductive loaded resin-based material, and a second outer layer 194 of non conductive resin-based material. In one embodiment the conductive stripe, or stripes, 196 and the outer layer 194 are formed over the inner layer 192 by co-extrusion. In another embodiment the conductive stripe, or stripes 196, and the outer layer 194 are over molded onto the inner layer. The novel pipe 190 in this embodiment shares the same capability for underground detection as the pipe and pipe locating structures described in the other preferred embodiments. The pipe 190 has the advantage of being less costly than previously discussed embodiments due to the reduced amount of conductive loaded resin-based material that is needed. When using the pipe 190 of this preferred embodiment care may need to be taken to line up the conductive stripes in order to preserve the conductive path between sections of pipe.

Figure 18:
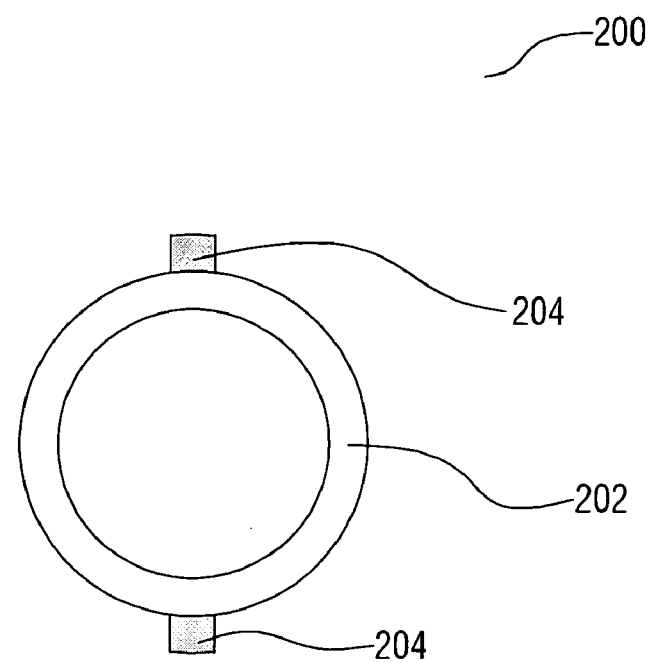
FIG. 18 illustrates a thirteenth preferred embodiment of the present invention showing a pipe structure formed in part of a conductive loaded resin-based material according to a thirteenth preferred embodiment of the present invention.

Referring now to FIG. 18, a thirteenth preferred embodiment of the present invention is illustrated. Another pipe 200 is shown in cross-sectional representation. The pipe 200 comprise, in part, the conductive loaded resin-based material of the present invention. In particular, the pipe 200 comprises an inner layer 202 of a non conductive resin-based material such as PVC, and at least one linear conductive stripe 204 of conductive loaded resin-based material. In one embodiment the conductive stripe, or stripes 204, are formed over the inner layer 202 by co-extrusion. In another embodiment the conductive stripe, or stripes 204, are over molded onto the inner layer. The novel pipe 200 in this embodiment shares the same capability for underground detection as the pipe and pipe locating structures described in the other preferred embodiments. The pipe 200 has the advantage of being less costly than previously discussed embodiments due to the reduced amount of conductive loaded resin-based material that is needed. When using the pipe 200 of this preferred embodiment care may need to be taken to line up the conductive stripes in order to preserve the conductive path between sections of pipe.

Figure 19:
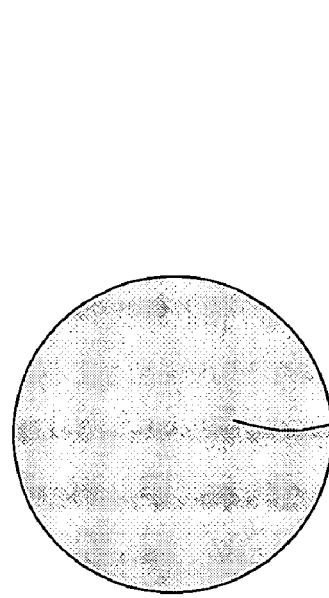
FIG. 19 illustrates a fourteenth preferred embodiment of the present invention showing an electric fence wire formed in part of a conductive loaded resin-based material according to the first preferred embodiment of the present invention.

Referring now to FIG. 19, a fourteenth preferred embodiment 300 of the present invention is shown in cross section. A conductor 300 for an electric fence is illustrated. The conductor 300 is formed of the conductive loaded resin-based material of the present invention. In traditional electric fence systems, a metal wire is used. Typically, to keep costs low, a steel wire is used. While steel wire is inexpensive and strong, it suffers the disadvantages of relatively high resistance and of corrosion. Alternatively, an aluminum wire is sometimes used to eliminate corrosion and to reduce resistance. However, aluminum increases cost and can easily break.

In the present invention, the electric fence conductor 302 comprises the conductive loaded resin-based material. The conductive loaded resin-based material offers several advantages. A low resistance conductor is achieved without a metal wire. The conductor is not susceptible to corrosion. Therefore, the performance degradation, or failure, due to corrosion of the electric fence wire is eliminated. The conductor weight is much less than steel or even aluminum wire. The conductor has excellent flexibility depending on the characteristics of the base resin. A further advantage over prior art electric fence wires is that the entire outer layer 302 is conductive rather than having just a few contact points along the wire. Therefore, the conductor offers an immediate behavioral stimulus to the animal upon first contact. According to another embodiment, a wide variety of colorants can be added to the conductive loaded resin-based material of the present invention and also offer a visual stimulus to aid in the training process. Finally, the low resistance of the present invention conductor 300 can reduce the number of fence charges needed to drive a long section of fence when compared to a steel wire system.

Figure 20:
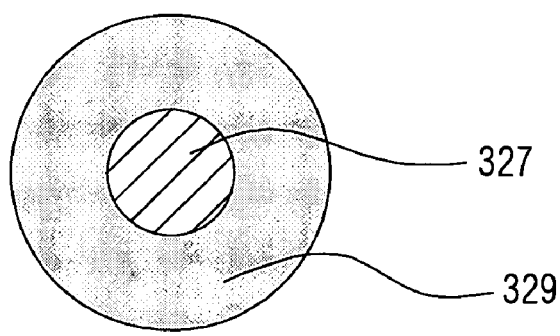
FIG. 20 illustrates a fifteenth preferred embodiment of the present invention showing an electric fence conductor formed of conductive loaded resin-based material according to the second preferred embodiment of the present invention.

Referring now to FIG. 20, a fifteenth preferred embodiment of the present invention is shown. An electric fence wire 320 is formed by extruding an outer layer 329 of the conductive loaded resin-based material of the present invention over a structure wire core 327. In this case, the wire core 327 serves as a structural reinforcement for the outer conductor 329. The wire core 327 may comprise a metal, such as steel, or a non-metal material, such as a rope or twine. Since the conductive loaded resin-based material 329 of the present invention is such a good conductor, any material that has the mechanical properties desired can be used for the structure wire core 327 regardless of its electrical properties. According to one embodiment, the wire core 327 comprises a very conductive material such as aluminum. According to another embodiment, the wire core 327 comprises a less conductive structural component such as steel. A significant advantage of the electric fence wire 320 in this second embodiment is the weather protection that is offered to the structure wire core 327 by the outer layer 329 of the conductive loaded resin-based material of the present invention.

Figure 21:
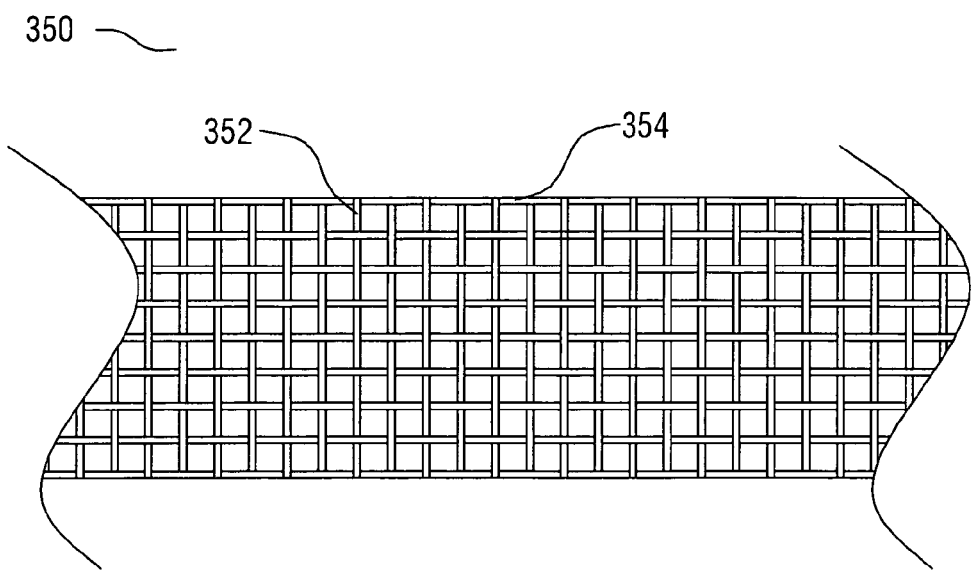
FIG. 21 illustrates a sixteenth preferred embodiment of the present invention showing an electric fence ribbon, or tape, formed of conductive loaded resin-based material according to the third preferred embodiment of the present invention.

Referring now to FIG. 21, a sixteenth preferred embodiment of the present invention is illustrated. An electric fence ribbon, or tape, 350 is shown. The electric fence tape 350 is typically used to electrify an existing fence such as a split rail fence for horse containment. In prior art the electric fence ribbon is formed with a mesh weave that utilized various amounts of copper or stainless steel strands of wire inter mixed with a high density polyethylene monofilament. In present invention, the entire electric fence ribbon 350 is formed of the conductive loaded resin-based material of the present invention. An excellent benefit realized by forming the electric fence ribbon 350 of the conductive loaded resin-based material of the present invention is that there is no exposed metal to corrode or break causing dead sections of fencing. As another significant feature, the entire ribbon 350 is conductive so that even if a small hole or tear is present in the vertical and horizontal strands 352 and 354, the entire electrical perimeter remains secure. Further advantages are realized in reduced manufacturing cost, less repair costs due to wire breakage, and the ability to fence longer sections without additional fence chargers due to the excellent conductivity of the tape 350.

Figure 22:
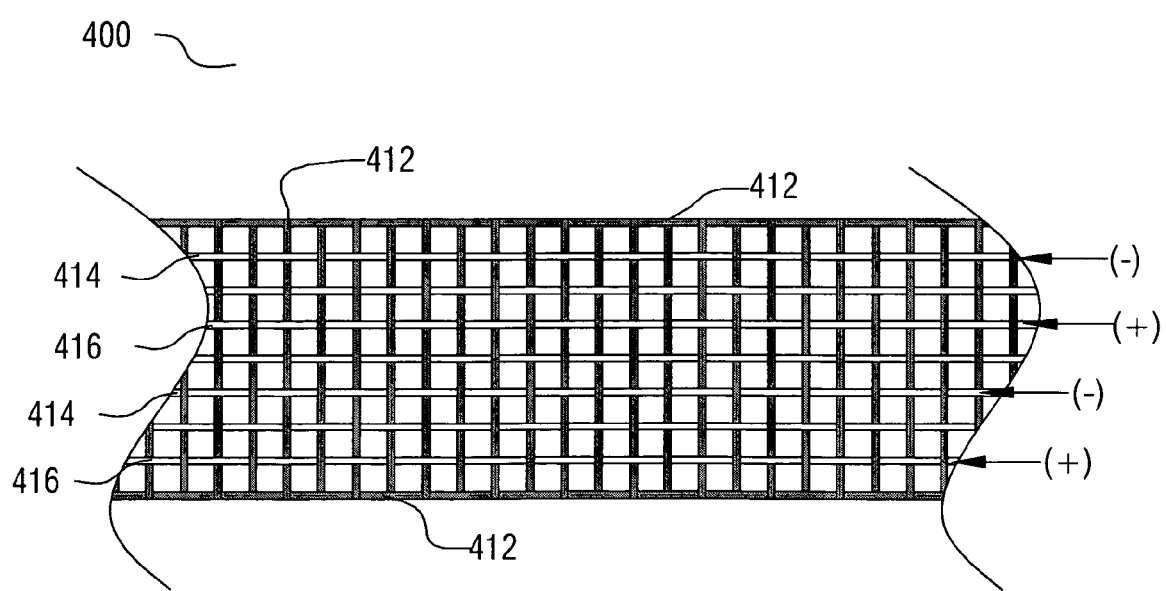
FIG. 22 illustrates a seventeenth preferred embodiment of the present invention showing an electric fence ribbon, or tape, formed in part of a conductive loaded resin-based material according to the fourth preferred embodiment of the present invention.

Referring now to FIG. 22, a seventeenth preferred embodiment of the present invention is illustrated. An electric fence ribbon, or tape, 400 with a fence ground return system is shown. Electric fence systems typically rely on earth for the ground return path. However, in some geographical areas where the ground becomes dry or frozen during different times of the year, the earth may not provide enough grounding to complete the circuit for animal behavior modification. Therefore, the electric fence ribbon 400 of this embodiment provides integrated ground returns. This tape 400 is particularly useful for electrify an existing fence such as a split rail fence for horse containment. The electric fence ribbon 400 is formed with a webbed pattern of separate conductive sections 414 and 416 and non-conductive sections 412 of resin based materials. When the animal touches the fence, it invariably will be in contact with both sides of the circuit and receive the desired behavior modification stimulus.

In prior art electric fence ribbon of this type is formed with a mesh weave that utilized various amounts of copper or stainless steel strands of wire running horizontally along the high density polyethylene monofilament ribbon mesh. In this embodiment the electric fence ribbon 400 is formed with every other horizontal conductive section 414 and 416 comprising the conductive loaded resin-based material of the present invention. In fence ground return systems, the charging unit applies a positive charge to every other horizontal section and a negative charge to the remaining horizontal sections. An excellent benefit realized by forming the horizontal conductive sections 414 and 416 in the electric fence ribbon 412 of the conductive loaded resin-based material of the present invention is that there is no exposed metal to corrode or break causing dead sections of fencing. Since the horizontal conductive sections of 414 and 416 retain their conductive state throughout the entire length and width of each section, the electrical perimeter will remain secure even if a hole or tear is present. Further advantages are realized in reduced manufacturing cost, less repair costs due to wire breakage, and the ability to fence long sections with fewer fence chargers, when compared to a steel wire system, due to the low resistance created by conductive loaded resin-based material of the present invention.

Figure 23:
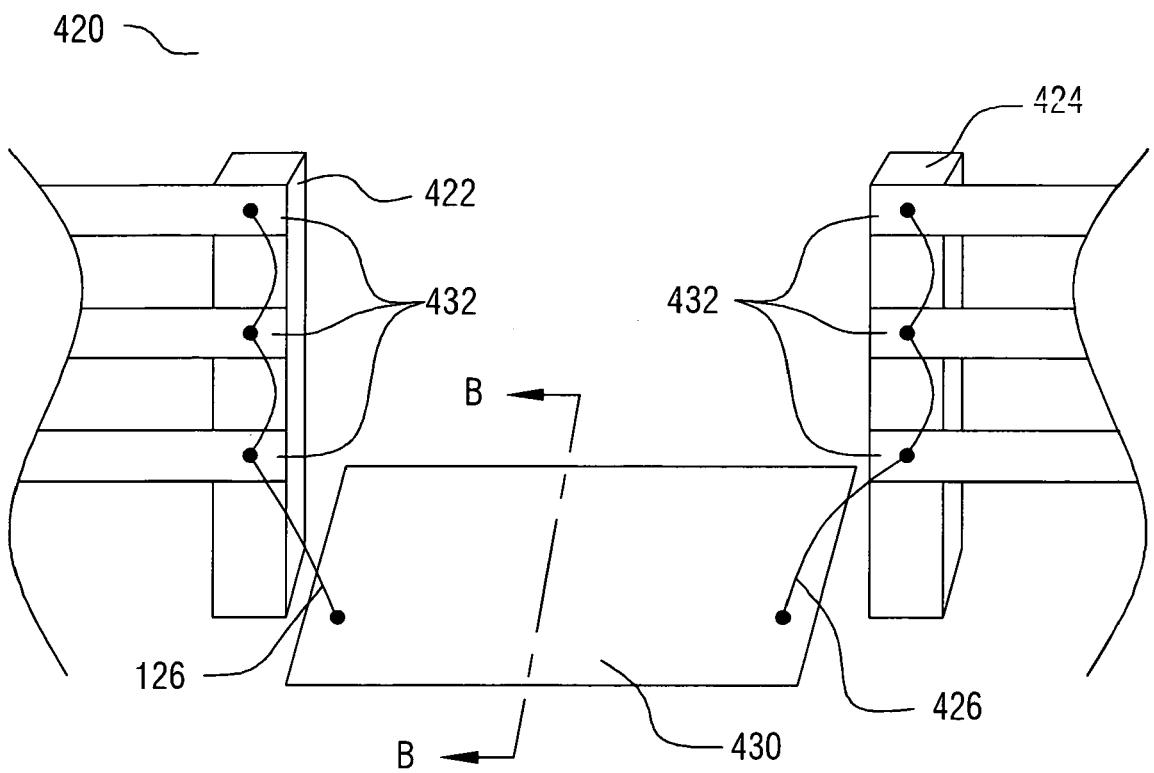
FIG. 23 illustrates an eighteenth preferred embodiment of the present invention showing an electric drive-thru gate formed of conductive loaded resin-based material according to the fifth preferred embodiment of the present invention.

Referring now to FIG. 23, an eighteenth preferred embodiment of the present invention is illustrated. An electric drive-thru gate 420 is shown. The electric drive-thru gate 420 is used for keeping livestock contained in an area where equipment such as tractors or trucks have to drive thru regularly while allowing the driver to remain in the vehicle without getting out and manually opening and closing the gate. The electrical charge is applied to the fence at the charging unit (not shown) tied together 432 at the gate posts 422 and 424 and connected to the charging mat 430 with a wire 426. When the animal steps on the charging mat 430 with one leg the other legs are still in contact with the ground which will complete the circuit and deliver the desired behavioral response stimuli. Since the equipment operator is driving on a machine with rubber tires that are non-conductive the circuit does not complete and deliver a charge to the vehicle. A further illustration of the charging mat 430 shown in this embodiment is shown in FIG. 23.

Figure 24:
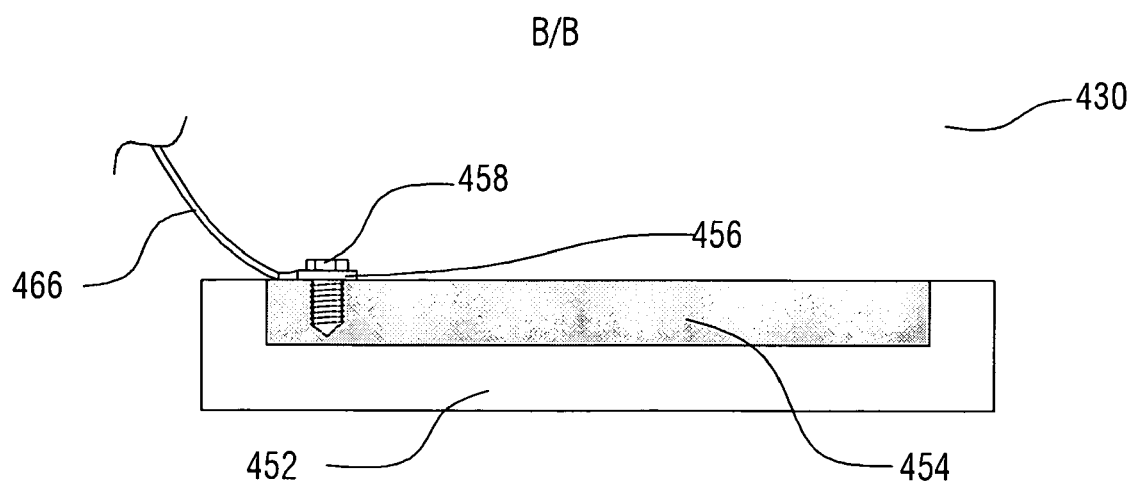
FIG. 24 illustrates a nineteenth preferred embodiment of the present invention showing a second view of an electric drive-thru gate formed of conductive loaded resin-based material according to the fifth preferred embodiment of the present invention.

Referring now to FIG. 24, a nineteenth sectional view of the charging mat 130 of the fifth preferred embodiment is illustrated. The charging mat 430 is formed by over molding an outer layer 452 of a non-conductive resin based material over an inner layer 454 of the conductive loaded resin-based material of the present invention. The charging mat 430 is connected to the potential charge with a wire 466 that has a terminal connector 456 at the end with a screw 458 threaded into the conductive matrix of the inner layer 454. While the connection is shown with a screw 458, the wire 466 could also terminate at the charging mat 430 with a terminal that is formed in the molding process in one embodiment or drilled and soldiered in another embodiment. The base resin chosen for the outer non-conductive layer 452 and the inner conductive layer 454 would be selected from any number of suitable resins with the desired properties for weathering the elements and remain flexible enough to allow equipment to drive over it repeatedly without cracking or breaking. In other embodiments the wire 466, the terminal connector 456 and the charging unit terminals or connectors (not shown) are formed of the conductive loaded resin-based material of the present invention.

Figure 2:
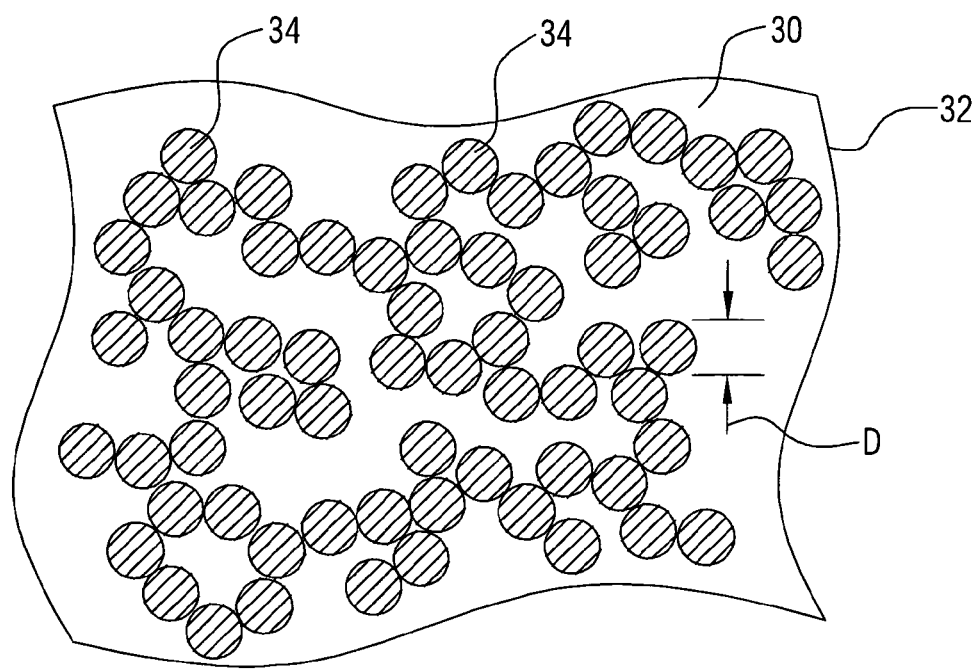
FIG. 2 illustrates a first preferred embodiment of a conductive loaded resin-based material wherein the conductive materials comprise a powder.

The conductive loaded resin-based material of the present invention typically comprises a micron powder(s) of conductor particles and/or in combination of micron fiber(s) substantially homogenized within a base resin host. FIG. 2 shows cross section view of an example of conductor loaded resin-based material 32 having powder of conductor particles 34 in a base resin host 30. In this example the diameter D of the conductor particles 34 in the powder is between about 3 and 12 microns.

Figure 3:
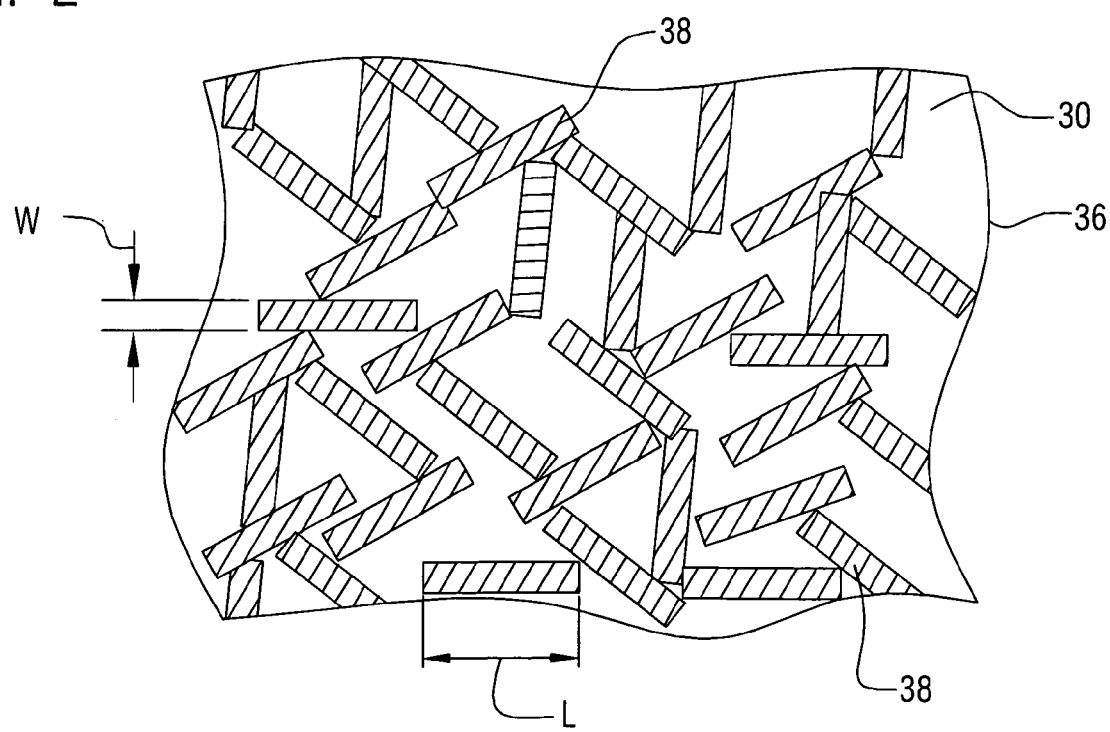
FIG. 3 illustrates a second preferred embodiment of a conductive loaded resin-based material wherein the conductive materials comprise micron conductive fibers.

FIG. 3 shows a cross section view of an example of conductor loaded resin-based material 36 having conductor fibers 38 in a base resin host 30. The conductor fibers 38 have a diameter of between about 3 and 12 microns, typically in the range of 10 microns or between about 8 and 12 microns, and a length of between about 2 and 14 millimeters. The micron conductive fibers 38 may be metal fiber or metal plated fiber. Further, the metal plated fiber may be formed by plating metal onto a metal fiber or by plating metal onto a non-metal fiber. Exemplary metal fibers include, but are not limited to, stainless steel fiber, copper fiber, nickel fiber, silver fiber, aluminum fiber, nichrome fiber, or the like, or combinations thereof. Exemplary metal plating materials include, but are not limited to, copper, nickel, cobalt, silver, gold, palladium, platinum, ruthenium, rhodium, and nichrome, and alloys of thereof. Any platable fiber may be used as the core for a non-metal fiber. Exemplary non-metal fibers include, but are not limited to, carbon, graphite, polyester, basalt, man-made and naturally-occurring materials, and the like. In addition, superconductor metals, such as titanium, nickel, niobium, and zirconium, and alloys of titanium, nickel, niobium, and zirconium may also be used as micron conductive fibers and/or as metal plating onto fibers in the present invention.

These conductor particles and/or fibers are substantially homogenized within a base resin. As previously mentioned, the conductive loaded resin-based materials have a sheet resistance between of less than about 5 to more than about 25 ohms per square, though other values can be achieved by varying the doping parameters and/or resin selection. To realize this sheet resistance the weight of the conductor material comprises between about 20% and about 50% of the total weight of the conductive loaded resin-based material. More preferably, the weight of the conductive material comprises between about 20% and about 40% of the total weight of the conductive loaded resin-based material. More preferably yet, the weight of the conductive material comprises between about 25% and about 35% of the total weight of the conductive loaded resin-based material. Still more preferably yet, the weight of the conductive material comprises about 30% of the total weight of the conductive loaded resin-based material. Stainless Steel Fiber of 6-12 micron in diameter and lengths of 4-6 mm and comprising, by weight, about 30% of the total weight of the conductive loaded resin-based material will produce a very highly conductive parameter, efficient within any EMF, thermal, acoustic, or electronic spectrum.

In yet another preferred embodiment of the present invention, the doping of conductive loading is determined using a volume percentage. In a most preferred embodiment, the conductive loading comprises a volume of between about 4% and about 10% of the total volume of the conductive loaded resin-based material. In a less preferred embodiment, the conductive loading comprises a volume of between about 1% and about 50% of the total volume of the conductive loaded resin-based material though the properties of the base resin may be impacted by high percent volume loading.

Figure 4:
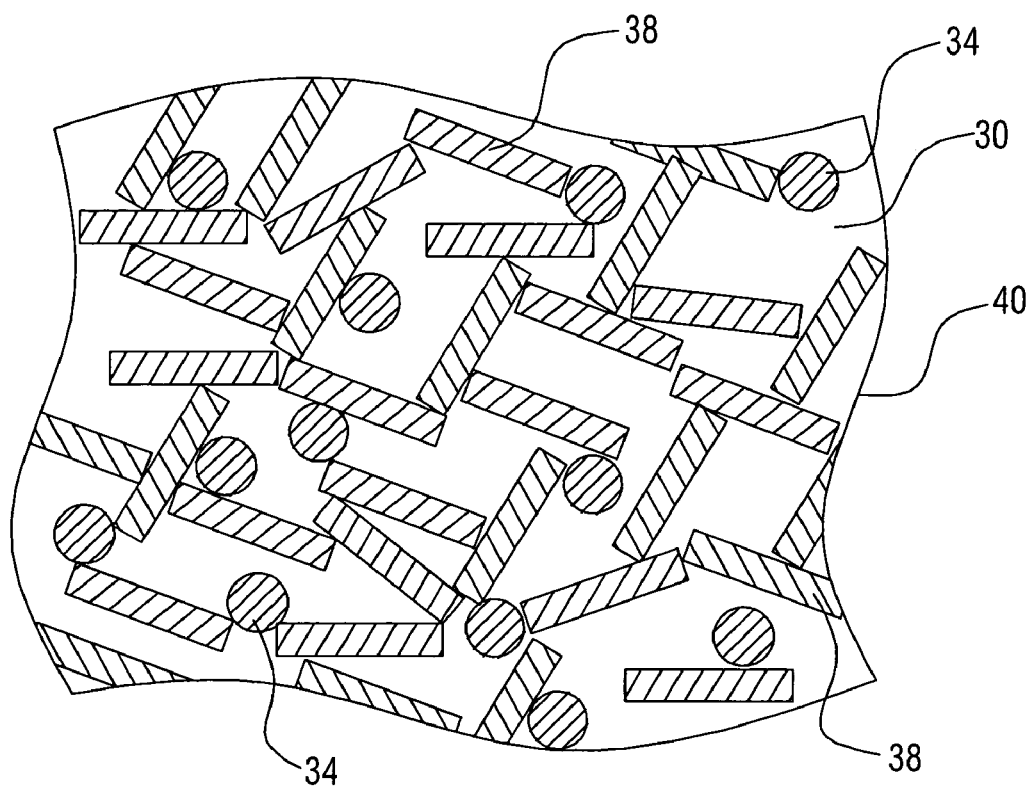
FIG. 4 illustrates a third preferred embodiment of a conductive loaded resin-based material wherein the conductive materials comprise both conductive powder and micron conductive fibers.

Referring now to FIG. 4, another preferred embodiment of the present invention is illustrated where the conductive materials comprise a combination of both conductive powders 34 and micron conductive fibers 38 substantially homogenized together within the resin base 30 during a molding process.

Figure 5A:
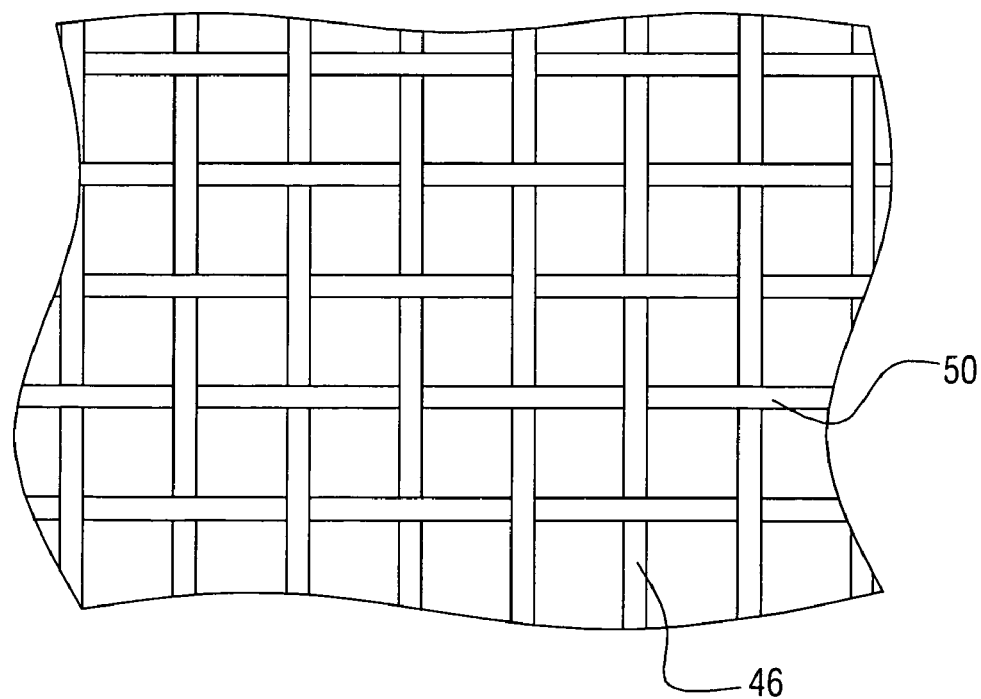
FIGS. 5a and 5b illustrate a fourth preferred embodiment wherein conductive fabric-like materials are formed from the conductive loaded resin-based material.
Figure 5B:
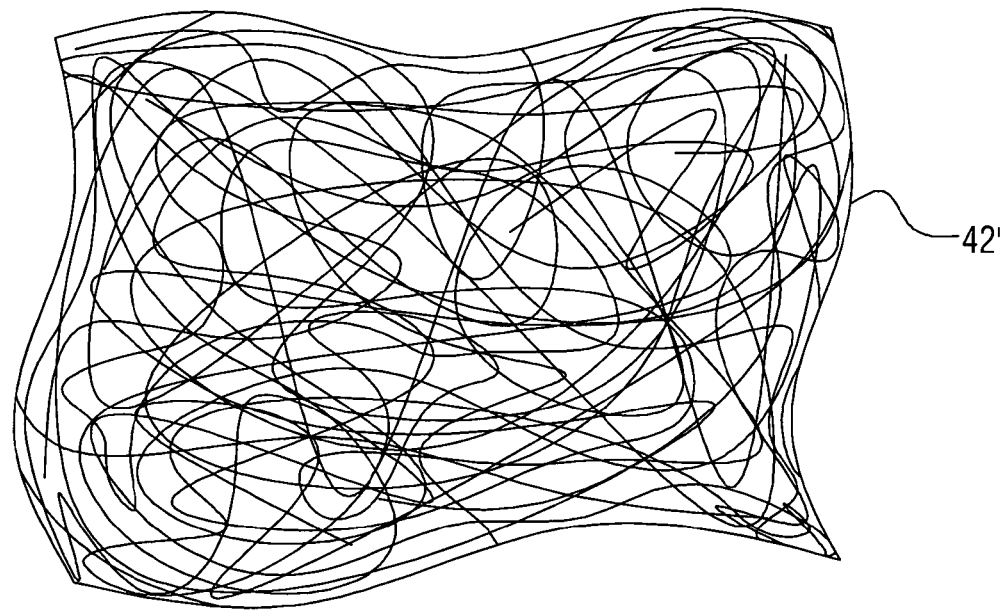

Referring now to FIGS. 5a and 5b, a preferred composition of the conductive loaded, resin-based material is illustrated. The conductive loaded resin-based material can be formed into fibers or textiles that are then woven or webbed into a conductive fabric. The conductive loaded resin-based material is formed in strands that can be woven as shown. FIG. 5a shows a conductive fabric 42 where the fibers are woven together in a two-dimensional weave 46 and 50 of fibers or textiles. FIG. 5b shows a conductive fabric 42' where the fibers are formed in a webbed arrangement. In the webbed arrangement, one or more continuous strands of the conductive fiber are nested in a random fashion. The resulting conductive fabrics or textiles 42, see FIG. 5a, and 42', see FIG. 5b, can be made very thin, thick, rigid, flexible or in solid form(s).

Similarly, a conductive, but cloth-like, material can be formed using woven or webbed micron stainless steel fibers, or other micron conductive fibers. These woven or webbed conductive cloths could also be sandwich laminated to one or more layers of materials such as Polyester(s), Teflon(s), Kevlar(s) or any other desired resin-based material(s). This conductive fabric may then be cut into desired shapes and sizes.

Figure 6A:
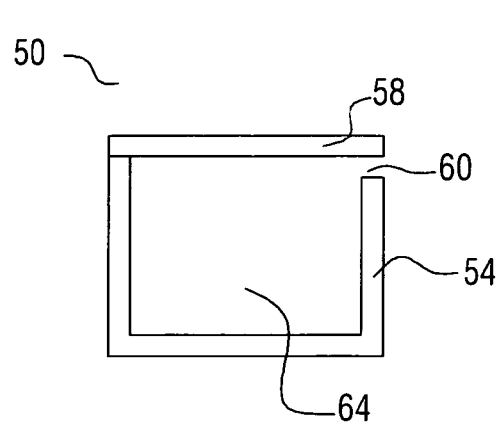
FIGS. 6a and 6b illustrate, in simplified schematic form, an injection molding apparatus and an extrusion molding apparatus that may be used to mold pipe and fencing of a conductive loaded resin-based material.

Locatable pipe and electric fence formed from conductive loaded resin-based materials can be formed or molded in a number of different ways including injection molding, extrusion, calendaring, compression molding, thermoset molding, or chemically induced molding or forming. FIG. 6a shows a simplified schematic diagram of an injection mold showing a lower portion 54 and upper portion 58 of the mold 50. Conductive loaded blended resin-based material is injected into the mold cavity 64 through an injection opening 60 and then the substantially homogenized conductive material cures by thermal reaction. The upper portion 58 and lower portion 54 of the mold are then separated or parted and the article are removed.

Figure 6B:
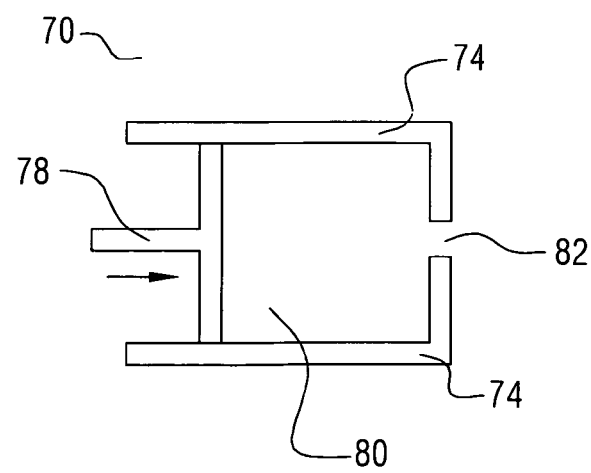

FIG. 6b shows a simplified schematic diagram of an extruder 70 for forming locatable pipe and electric fence using extrusion. Conductive loaded resin-based material(s) is placed in the hopper 80 of the extrusion unit 74. A piston, screw, press or other means 78 is then used to force the thermally molten or a chemically induced, compression or thermoset curing conductive loaded resin-based material through an extrusion opening 82 which shapes the thermally molten curing or chemically induced cured conductive loaded resin-based material to the desired shape. The conductive loaded resin-based material is then fully cured by chemical reaction or thermal reaction to a hardened or pliable state and is ready for use. Thermoplastic or thermosetting resin-based materials and associated processes may be used in molding the conductive loaded resin-based articles of the present invention.

The advantages of the present invention may now be summarized. An effective locatable pipe is achieved. An effective electric fence is achieved. The locatable pipe is robust for buried pipe installation. A non-metal pipe that is locatable via metal detection methods is achieved. The electric fence is not susceptible to corrosion. The electric fence will work properly even if partially damaged. A method to form an effective locatable pipe is achieved. A method to form an effective electric fence is achieved. The locatable pipe and electric fence is molded of conductive loaded resin-based materials. The electrical and thermal characteristics can be altered or the visual characteristics can be altered by forming a metal layer over the conductive loaded resin-based material. A method is described to fabricate an electric fence from a conductive loaded resin-based material where the material is in the form of a fabric.

As shown in the preferred embodiments, the novel methods and devices of the present invention provide an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A detectable pipe device comprising a hollow sleeve having a first opening and a second opening wherein said hollow sleeve comprises:
 a first layer of non-conductive material; and
 a second layer of conductive material comprising conductive loaded, resin-based material comprising micron conductive fiber substantially homogeneously mixed with a base resin host.

2. The device according to claim 1 wherein the percent by weight of said micron conductive fiber is between about 20% and about 50% of the total weight of said conductive loaded resin-based material.

3. The device according to claim 1 wherein said micron conductive fiber is nickel plated carbon micron fiber, stainless steel micron fiber, copper micron fiber, silver micron fiber or combinations thereof.

4. The device according to claim 1 wherein said micron conductive fiber is a non-conductive inner core with outer metal plating.

5. The device according to claim 1 wherein said conductive loaded resin-based material further comprises micron conductive powder.

6. The device according to claim 5 wherein said micron conductive powder is nickel, copper, or silver.

7. The device according to claim 5 wherein said micron conductive powder is a non-conductive inner core with outer metal plating.

8. The device according to claim 1 wherein said conductive loaded resin-based material further comprises a ferromagnetic material.

9. The device according to claim 1 wherein said conductive loaded resin-based material is painted.

10. The device according to claim 1 wherein said first layer comprises a resin-based material.

11. The device according to claim 1 further comprising a third layer of non-conductive material wherein said second layer is disposed between said first and third layers.

12. The device according to claim 11 further comprising a fourth layer of conductive material comprising said conductive loaded resin-based material wherein said third layer is between said second and fourth layers.

13. The device according to claim 12 further comprising a fifth layer of conductive material comprising said conductive loaded resin-based material wherein said fourth layer is between said third and fifth layers.

14. The device according to claim 1 wherein said second layer comprises a stripe of material running longitudinally along said first layer.

15. The device according to claim 1 further comprising a valve disposed inside of said hollow sleeve.

16. The device according to claim 1 wherein said hollow sleeve further comprises a Y or T branch.

17. An electric fence device comprising:
   a voltage source; and
   a plurality of conductors comprising conductive material comprising conductive loaded, resin-based material comprising micron conductive fiber substantially homogeneously mixed in a base resin host.

18. The device according to claim 17 wherein the percent by weight of said micron conductive fiber is between about 20% and about 50% of the total weight of said conductive loaded resin-based material.

19. The device according to claim 17 wherein said micron conductive fiber is nickel plated carbon micron fiber, stainless steel micron fiber, copper micron fiber, silver micron fiber or combinations thereof.

20. The device according to claim 17 wherein said micron conductive fiber is a non-conductive inner core with outer metal plating.

21. The device according to claim 17 wherein said conductive loaded resin-based material further comprises micron conductive powder.

22. The device according to claim 21 wherein said micron conductive powder is nickel, copper, or silver.

23. The device according to claim 21 wherein said micron conductive powder is a non-conductive inner core with outer metal plating.

24. The device according to claim 17 wherein said conductive loaded resin-based material further comprises a ferromagnetic material.

25. The device according to claim 17 wherein said conductive loaded resin-based material is painted.

26. The device according to claim 17 wherein said conductors further comprises a metal wire and wherein said conductive loaded resin-based material surrounds said metal wire.

27. The device according to claim 17 wherein said plurality of conductors are woven into a mesh.

28. The device according to claim 27 wherein mesh includes a voltage path and a ground return path.

* * * * *